(12) United States Patent　　(10) Patent No.: US 12,127,138 B2
Wang et al.　　(45) Date of Patent: Oct. 22, 2024

(54) BLUETOOTH TRANSMIT POWER CONTROL METHOD AND TERMINAL DEVICE

(71) Applicant: Huawei Technologies Co., Ltd., Shenzhen (CN)

(72) Inventors: Liang Wang, Shanghai (CN); Renfei Zhu, Shanghai (CN); Ya Zhang, Shenzhen (CN); Jiongjin Su, Shenzhen (CN); Tongbo Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 605 days.

(21) Appl. No.: 17/440,941

(22) PCT Filed: Mar. 19, 2020

(86) PCT No.: PCT/CN2020/080178
§ 371 (c)(1),
(2) Date: Sep. 20, 2021

(87) PCT Pub. No.: WO2020/192546
PCT Pub. Date: Oct. 1, 2020

(65) Prior Publication Data
US 2022/0124643 A1　Apr. 21, 2022

(30) Foreign Application Priority Data
Mar. 26, 2019　(CN) .......................... 201910234733.4

(51) Int. Cl.
*H04W 4/80*　　(2018.01)
*H04W 52/02*　(2009.01)
(Continued)

(52) U.S. Cl.
CPC ........... *H04W 52/383* (2013.01); *H04W 4/80* (2018.02); *H04W 52/0245* (2013.01); *H04W 52/241* (2013.01)

(58) Field of Classification Search
CPC . H04W 52/383; H04W 4/80; H04W 52/0245; H04W 52/241; H04W 52/245;
(Continued)

(56) References Cited

U.S. PATENT DOCUMENTS 9,465,377 B2 * 10/2016 Davis ..................... G08C 17/02
9,749,953 B2 * 8/2017 Seo .......................... H04W 4/80
(Continued)

FOREIGN PATENT DOCUMENTS

CN　　　　1878027 A　　12/2006
CN　　　107205217 A　　9/2017
(Continued)

*Primary Examiner* — Julio R Perez
(74) *Attorney, Agent, or Firm* — SLATER MATSIL, LLP

(57) ABSTRACT

A power control device and method, the method including obtaining, by a terminal device, class of device information of a peer device, determining, by the terminal device, based on the class of device information, a class of device of the peer device, and performing at least one of sending, by the terminal device, in response to the terminal device determining that the class of device of the peer device is a non-preset class of device, data to the peer device at a first transmit power, or sending, by the terminal device, data to the peer device at a second transmit power—in response to the terminal device determining that the class of device of the peer device is a preset class of device, —where the terminal device establishes a Bluetooth connection to the peer device, and the first transmit power is less than the second transmit power.

16 Claims, 18 Drawing Sheets

(51) Int. Cl.
*H04W 52/24* (2009.01)
*H04W 52/38* (2009.01)

(58) Field of Classification Search
CPC . H04W 52/26; H04W 52/267; H04W 52/265; H04W 52/0209; H04W 52/28
See application file for complete search history.

(56) References Cited

U.S. PATENT DOCUMENTS

| | | | |
|---|---|---|---|
| 10,531,406 B2 * | 1/2020 | Li | H04W 52/383 |
| 2013/0045680 A1 * | 2/2013 | Dua | H04W 4/70 |
| | | | 455/41.1 |
| 2013/0229930 A1 * | 9/2013 | Akay | H04W 12/64 |
| | | | 370/252 |
| 2016/0087687 A1 * | 3/2016 | Kesler | H02J 50/80 |
| | | | 307/104 |
| 2016/0141886 A1 | 5/2016 | Eguchi et al. | |
| 2016/0183270 A1 * | 6/2016 | Jiao | H04L 1/0026 |
| | | | 370/329 |
| 2017/0208554 A1 * | 7/2017 | Hoshino | H04W 52/248 |
| 2018/0270765 A1 * | 9/2018 | Wang | H04W 52/02 |
| 2018/0359711 A1 * | 12/2018 | Akkarakaran | H04W 52/267 |
| 2019/0357153 A1 * | 11/2019 | Zhang | H04W 52/08 |
| 2022/0124643 A1 * | 4/2022 | Wang | H04W 52/245 |

FOREIGN PATENT DOCUMENTS

| | | | |
|---|---|---|---|
| CN | 109005579 A | 12/2018 | |
| CN | 109005582 A | 12/2018 | |
| CN | 109275131 A | 1/2019 | |
| CN | 109474372 A | 3/2019 | |
| EP | 3225105 A1 | 10/2017 | |

\* cited by examiner

BLUETOOTH TRANSMIT POWER CONTROL METHOD AND TERMINAL DEVICE

CROSS REFERENCE TO RELATED APPLICATIONS

This application is a national stage of International Application No. PCT/CN2020/080178, filed on Mar. 19, 2020, which claims priority to Chinese Patent Application No. 201910234733.4, filed with the China National Intellectual Property Administration on Mar. 26, 2019 and entitled "BLUETOOTH TRANSMIT POWER CONTROL METHOD AND TERMINAL DEVICE", which is incorporated herein by reference in its entirety.

TECHNICAL FIELD

This application relates to the data transmission field, and in particular, to a power control method in the Bluetooth field.

BACKGROUND

With diversification of functions of a terminal device, a data transmission capability has become one of important indicators of the terminal device, and a short-distance transmission technology is widely used in the data transmission field because of inherent characteristics such as high transmission efficiency, practicality, and high compatibility. Bluetooth transmission is used as an example. Due to consideration of a technical capability, costs, and power consumption, a transmit power of a terminal device in the current market is generally low, and is far less than that specified in a protocol (for example, a maximum transmit power specified in the protocol is 20 dBm). As a result, during service coverage, data transmission has a relatively short distance, and is easily affected by an intra-frequency signal (for example, a Wi-Fi signal), resulting in poor experience of a real-time service such as audio.

SUMMARY and method, to help reduce power consumption and enable a user to have better data transmission experience.

According to one aspect, an embodiment of this application provides a terminal device. The device includes one or more processors, a memory, a plurality of applications, and one or more computer programs. The one or more computer programs are stored in the memory, the one or more computer programs include instructions, and when the instructions are executed by the terminal device, the terminal device is enabled to perform the following operations: The terminal device obtains class of device information of a peer device. The terminal device determines a class of device of the peer device based on the class of device information of the peer device. When the class of device is a non-preset class of device, the terminal device sends data to the peer device at a first transmit power. When the class of device is a preset class of device, the terminal device sends data to the peer device at a second transmit power. The terminal device establishes a Bluetooth connection to the peer device, and the first transmit power is less than the second transmit power.

Different power control is implemented based on different devices, so as to meet different power consumption and user requirements.

In some possible implementations, when the terminal device determines that the peer device is the preset class of device, the terminal device receives a first request of the peer device. The first request is used to increase a transmit power of the terminal device to the second transmit power. In response to the first request, the terminal device sends data to the peer device at the second transmit power.

It can be implemented that the terminal device implements dynamic power control based on a request of the peer device.

In some possible implementations, when the class of device is the preset class of device, the terminal device determines that channel quality of the Bluetooth connection meets a first preset condition, and the terminal device sends data to the peer device at the second transmit power. The first preset condition is that a parameter of the Bluetooth connection is less than a first threshold. The parameter includes a retransmission rate or a received signal strength indicator.

In the foregoing manner, the terminal device can independently implement the dynamic power control.

In some possible implementations, the terminal device can increase the transmit power to the second transmit power by using a power amplifier of a Wi-Fi radio frequency link.

In the foregoing manner, power level switching may be performed by using a power amplifier in a Wi-Fi transmit channel.

In some embodiments, the class of device information includes CoD (Class of Device) information or UUID (universally unique identifier) information of the peer device.

The class of device of the peer device can be implemented in a plurality of manners.

According to an aspect of a second aspect, an embodiment of this application provides a method, and the method includes: A terminal device obtains class of device information of a peer device. The terminal device determines a class of device of the peer device based on the class of device information of the peer device. When the class of device is a non-preset class of device, the terminal device sends data to the peer device at a first transmit power. When the class of device is a preset class of device, the terminal device sends data to the peer device at a second transmit power. The terminal device establishes a Bluetooth connection to the peer device, and the first transmit power is less than the second transmit power.

In the foregoing method, different power control is implemented based on different devices, so as to meet different power consumption and user requirements.

In some possible implementations, when the terminal device determines that the peer device is the preset class of device, the terminal device receives a first request of the peer device. The first request is used to increase a transmit power of the terminal device to the second transmit power. In response to the first request, the terminal device sends data to the peer device at the second transmit power.

In the foregoing method, it can be implemented that the terminal device implements dynamic power control based on a request of the peer device.

In some possible implementations, when the class of device is the preset class of device, the terminal device determines that channel quality of the Bluetooth connection meets a first preset condition, and the terminal device sends data to the peer device at the second transmit power. The first preset condition is that a parameter of the Bluetooth connection is less than a first threshold. The parameter includes a retransmission rate or a received signal strength indicator.

In the foregoing method, the terminal device can independently implement the dynamic power control.

In some possible implementations, the terminal device can increase the transmit power to the second transmit power by using a power amplifier of a Wi-Fi radio frequency link.

In the foregoing method, power level switching may be performed by using a power amplifier in a Wi-Fi transmit channel.

In some embodiments, the class of device information includes CoD (Class of Device) information or UUID (universally unique identifier) information of the peer device.

In the foregoing method, the class of device of the peer device can be implemented in a plurality of manners.

According to a third aspect, an embodiment of this application provides a terminal device, including one or more processors, a memory, a plurality of applications, and one or more computer programs. The one or more computer programs are stored in the memory, the one or more computer programs include instructions, and when the instructions are executed by the terminal device, the terminal device is enabled to perform the following operations: The terminal device obtains class of device information of a peer device. The terminal device determines a class of device of the peer device based on the class of device information of the peer device. When the class of device is an audio or video class of device, the terminal device increases a transmit power, and sends data to the peer device at an increased transmit power.

The terminal device may implement power amplification control on an audio or video device, so as to implement better music or video experience.

In some embodiments, when the class of device is the audio or video class of device, the terminal device receives a first request of the peer device. The first request is used to increase the transmit power of the terminal device.

In response to the first request, the terminal device increases the transmit power, and sends the data to the peer device at the increased transmit power.

It can be implemented that the terminal device implements dynamic power control based on a request of the audio or video device.

In some embodiments, when the class of device is the audio or video class of device, the terminal device determines that channel quality of a Bluetooth connection meets a first preset condition. The first preset condition is that a parameter of the Bluetooth connection is less than a first threshold. The parameter includes a retransmission rate or a received signal strength indicator. The terminal device increases the transmit power, and sends the data to the audio or video device at the increased transmit power.

In the foregoing manner, the terminal device can independently implement the dynamic power control.

In some embodiments, when the class of device is the audio or video class of device, the terminal device determines that the class of device is the audio or video class of device; the terminal device determines that channel quality of the Bluetooth connection meets a first preset condition; the terminal device determines that a Voice over Wi-Fi service or a key frame of a Wi-Fi service is not received or sent; and the terminal device increases the transmit power, and sends the data to the audio or video device at the increased transmit power.

The foregoing manner can implement coexistence of the Wi-Fi service and a Bluetooth service of the terminal device, In some embodiments, the class of device information includes CoD (Class of Device) information or UUID (universally unique identifier) information of the peer device.

The class of device of the peer device can be implemented in a plurality of manners.

According to a fourth aspect, an embodiment of this application provides a method, and the method includes: A terminal device obtains class of device information of a peer device. The terminal device determines a class of device of the peer device based on the class of device information of the peer device. When the class of device is an audio or video class of device, the terminal device increases a transmit power, and sends data to the peer device at an increased transmit power.

In the foregoing method, power amplification control may be implemented on an audio or video device, so as to implement better music or video experience.

In some embodiments, when the class of device is the audio or video class of device, the terminal device receives a first request of the peer device. The first request is used to increase the transmit power of the terminal device.

In response to the first request, the terminal device increases the transmit power, and sends the data to the peer device at the increased transmit power.

It can be implemented that the terminal device implements dynamic power control based on a request of the audio or video device.

In some embodiments, when the class of device is the audio or video class of device, the terminal device determines that channel quality of a Bluetooth connection meets a first preset condition. The first preset condition is that a parameter of the Bluetooth connection is less than a first threshold. The parameter includes a retransmission rate or a received signal strength indicator. The terminal device increases the transmit power, and sends the data to the audio or video device at the increased transmit power.

In the foregoing manner, the terminal device can independently implement the dynamic power control.

In some embodiments, when the class of device is the audio or video class of device, the terminal device determines that the class of device is the audio or video class of device; the terminal device determines that channel quality of the Bluetooth connection meets a first preset condition; the terminal device determines that a Voice over Wi-Fi service or a key frame of a Wi-Fi service is not received or sent; and the terminal device increases the transmit power, and sends the data to the audio or video device at the increased transmit power.

The foregoing manner can implement coexistence of the Wi-Fi service and a Bluetooth service of the terminal device.

In some embodiments, the class of device information includes CoD (Class of Device) information or UUID (universally unique identifier) information of the peer device.

The class of device of the peer device can be implemented in a plurality of manners.

According to a fifth aspect, an embodiment of this application provides a method, and the method includes: A terminal device obtains class of device information of a peer device. The terminal device determines, based on the class of device information of the peer device, that a class of device of the peer device is an audio or video class of device; and receives a first request of the peer device. The first request is used to increase a transmit power of the terminal device. The terminal device determines an increased transmit power based on the first request and a current transmit power of the terminal device. The current transmit power belongs to a first power level. When the increased transmit power belongs to a second power level, the terminal device switches the first power level to the second power level, so as to send data to the peer device at the increased transmit power.

In the foregoing method, the terminal device can dynamically adjust an output power based on different power levels.

In some embodiments, a maximum transmit power in the first power level is less than a maximum transmit power supported by a Bluetooth chip in the terminal device. A transmit power in the second power level is greater than the maximum transmit power supported by the Bluetooth chip in the terminal device.

In the foregoing manner, the terminal device may further determine whether a power level needs to be improved, so as to send the data to the peer device at the increased transmit power.

In some embodiments, the switching the first power level to the second power level includes: multiplexing a power amplifier in a Wi-Fi transmit channel. The power amplifier in the Wi-Fi transmit channel is configured to increase the transmit power of the terminal device.

In the foregoing manner, power level switching may be performed by using the power amplifier in the Wi-Fi transmit channel.

According to a sixth aspect, an embodiment of this application further provides a chip, including a processor and an interface. The interface is configured to receive code instructions and transmit the instructions to the processor. The processor is configured to run the code instructions to perform a method: obtaining class of device information of a peer device; determining a class of device of the peer device based on the class of device information of the peer device; and when it is determined that the class of device of the peer device is not a preset class of device, sending data to the peer device at a first transmit power; or when the class of device of the peer device is a preset class of device, sending data to the peer device at a second transmit power. The chip establishes a Bluetooth connection to the peer device, and the first transmit power is less than the second transmit power.

According to a seventh aspect, an embodiment of this application further provides a computer program product. The computer program product includes instructions. When the computer program product runs on a terminal device, the terminal device is enabled to perform the following: obtaining class of device information of a peer device; determining a class of device of the peer device based on the class of device information of the peer device; and when it is determined that the class of device of the peer device is not a preset class of device, sending data to the peer device at a first transmit power; or when the class of device of the peer device is a preset class of device, sending data to the peer device at a second transmit power. The chip establishes a Bluetooth connection to the peer device, and the first transmit power is less than the second transmit power.

According to an eighth aspect, an embodiment of this application further provides a readable storage medium, including instructions. When the instructions are run on a terminal device, the terminal device is enabled to perform the following: obtaining class of device information of a peer device; determining a class of device of the peer device based on the class of device information of the peer device; and when it is determined that the class of device of the peer device is not a preset class of device, sending data to the peer device at a first transmit power; or when the class of device of the peer device is a preset class of device, sending data to the peer device at a second transmit power. The chip establishes a Bluetooth connection to the peer device, and the first transmit power is less than the second transmit power.

According to a ninth aspect, an embodiment of this application further provides a method. The method is applied to a terminal device, including: obtaining class of device information of a peer device; determining a class of device of the peer device based on the class of device information of the peer device; when the class of device of the peer device is a preset class of device, displaying, by the terminal device, prompt information, where the prompt information is used to prompt a user whether to accept or reject sending data to the peer device in a high-power mode; and after receiving an accepting operation of the user, sending, by the terminal device, the data to the peer device in the high-power mode.

In the foregoing methods, the transmit power may be increased according to the preset class of device based on a selection of the user.

DETAILED DESCRIPTION OF ILLUSTRATIVE EMBODIMENTS

A terminal device mentioned in embodiments of this application may be a mobile phone, a tablet, a handheld computer, a laptop, an ultra-mobile personal computer (UMPC), a netbook, a cellular phone, a personal digital assistant (PDA), a wearable device (for example, a smartwatch), or an augmented reality (AR)/virtual reality (VR) device. A specific form of the device is not particularly limited in the embodiments.

Because the embodiments of this application relate to data transmission by using a short-distance communications technology, a peer device corresponding to the terminal device needs to be introduced, and the peer device (also referred to as a secondary device) described in this application may be a mobile phone, a tablet, a handheld computer, a laptop, an ultra-mobile personal computer (UMPC), a netbook, a cellular phone, a personal digital assistant (PDA), a wearable device (for example, a smartwatch), an augmented reality (AR)/virtual reality (VR) device, a smart speaker, a headset, a vehicle-mounted device, a mouse, a keyboard, a printer, a camera, a video camera, and the like.

According to a Bluetooth protocol, a data transmission system may include a primary device. It may be understood that the primary device and the secondary device may be devices of a same type. For example, the primary device is a mobile phone, and the secondary device may also be a mobile phone. For ease of description, in this application, the primary device may be referred to as the terminal device, and the secondary device may be referred to as the peer device.

Terminal Device

Figure 1:
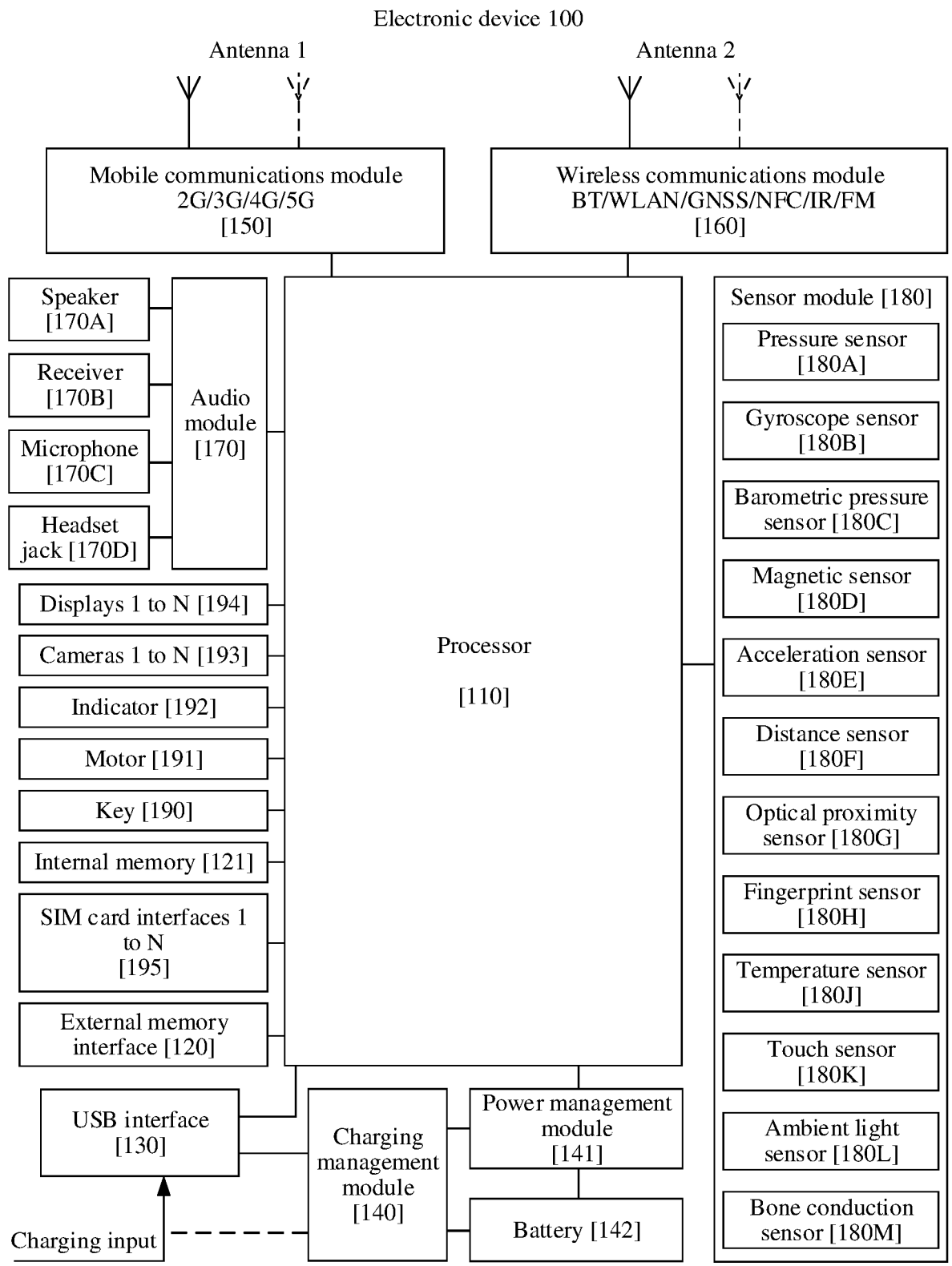
FIG. 1 is a first schematic structural diagram of a terminal device 100 according to this application.

FIG. 1 is a schematic structural diagram of a terminal device 100. According to some embodiments of the present invention, a possible first schematic diagram is provided.

The terminal device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present invention does not constitute a specific limitation on the terminal device 100. In some other embodiments of this application, the terminal device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory, to avoid repeated access and reduce a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal device 100. The processor 110 communicates with the display 194 through the DSI interface, to implement a display function of the terminal device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the terminal device 100, or may be configured to transmit data between the terminal device 100 and a peripheral device, or may be configured to connect to a headset, to play audio through the headset. Alternatively, the interface may be configured to connect to another terminal device such as an AR device.

It may be understood that an interface connection relationship between the modules that is shown in this embodiment of the present invention is merely an example for description, and does not constitute a limitation on the structure of the terminal device 100. In some other embodiments of this application, the terminal device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input through a wireless charging coil of the terminal device 100. The charging management module 140 supplies power to the terminal device by using the power management module 141 while charging the battery 142.

The power management module 141 is configured to connect the battery 142, the charging management module 140, and the processor 110. The power management module 141 receives input of the battery 142 and/or input of the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal device 100 may be configured to cover one or more communications frequency bands. Different antennas may be further multiplexed to improve antenna utilization. For example, the antenna 1 may be multiplexed as a diversity antenna in a wireless local area network. In other embodiments, the antenna may be used in combination with a tuning switch.

The mobile communications module 150 may provide a wireless communication solution that is applied to the terminal device 100 and that includes 2G/3G/4G/5G or the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules of the mobile communications module 150 may be disposed in the processor 110. In some embodiments, at least some function modules of the mobile communications module 150 may be disposed in the same device as at least some modules of the processor 110.

The modem processor may include a modulator and a demodulator. The modulator is configured to modulate a to-be-sent low frequency baseband signal into a medium and high frequency signal. The demodulator is configured to demodulate a received electromagnetic wave signal into a low frequency baseband signal. Then, the demodulator transmits the low frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in the same device as the mobile communications module 150 or another function module.

The wireless communications module 160 may provide a solution, applied to the terminal device 100, to wireless communication including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the terminal device 100 is coupled to the mobile communications module 150, and the antenna 2 is coupled to the wireless communications module 160, so that the terminal device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 implements the display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the terminal device 100 may include one or N displays 194, where N is a positive integer greater than 1.

The terminal device 100 may implement the photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193. [OHO] The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 193, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transformation on frequency energy.

The video codec is configured to compress or decompress a digital video. The terminal device 100 may support one or more video codecs. In this way, the terminal device 100 may play or record videos in a plurality of coding formats, for example, moving picture experts group (moving picture experts group, MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the terminal device 100, for example, image recognition, facial recognition, voice recognition, and text understanding, may be implemented through the NPU.

The external memory interface 120 may be configured to connect to an external storage card, for example, a micro SD card, to extend a storage capability of the terminal device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data or a phone book) created in a use process of the terminal device 100, and the like. In addition, the internal memory 121 may include a high-speed random access memory, or may include a nonvolatile memory, for example, at least one magnetic disk storage device, a flash memory, or a universal flash storage (UFS). The processor 110 runs the instructions stored in the internal memory 121 and/or the instructions stored in the memory disposed in the processor, to perform various function applications of the terminal device 100 and data processing.

The terminal device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The terminal device 100 may be used to listen to music or answer a call in a hands-free mode over the speaker 170A.

The receiver 170B, also referred to as an "earpiece", is configured to convert an audio electrical signal into a sound signal. When a call is answered or a voice message is received through the terminal device 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C through the mouth of the user, to input the sound signal to the microphone 170C. At least one microphone 170C may be disposed in the terminal device 100. In some other embodiments, two microphones 170C may be disposed in the terminal device 100, to implement a noise reduction function, in addition to collecting the sound signal. In some other embodiments, three, four, or more microphones 170C may alternatively be disposed in the terminal device 100, to collect a sound signal and reduce noise. The microphones may further recognize a sound source, to implement a directional recording function, and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194.

There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines pressure intensity based on a capacitance change. When a touch operation is performed on the display 194, the terminal device 100 detects intensity of the touch operation by using the pressure sensor 180A. The terminal device 100 may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyroscope sensor 180B may be configured to determine a motion posture of the terminal device 100. In some embodiments, an angular velocity of the terminal device 100 around three axes (namely, axes x, y, and z) may be determined by using the gyroscope sensor 180B. The gyroscope sensor 180B may be configured to perform image stabilization during photographing. For example, when the shutter is pressed, the gyroscope sensor 180B detects an angle at which the terminal device 100 jitters, obtains, through calculation based on the angle, a distance for which a lens module needs to compensate, and allows the lens to cancel jitter of the terminal device 100 through reverse motion, to implement image stabilization. The gyroscope sensor 180B may also be used in a navigation scenario and a somatic game scenario.

The barometric pressure sensor 180C is configured to measure barometric pressure. In some embodiments, the terminal device 100 calculates an altitude based on a barometric pressure value measured by the barometric pressure sensor 180C, to assist in positioning and navigation.

The magnetic sensor 180D includes a Hall sensor. The terminal device 100 may detect opening and closing of a flip leather case by using the magnetic sensor 180D. In some embodiments, when the terminal device 100 is a clamshell phone, the terminal device 100 may detect opening and closing of a clamshell by using the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the terminal device 100, and may detect a value and a direction of gravity when the terminal device 100 is still. The acceleration sensor 180E may be further configured to identify a posture of the terminal device, and is applied to an application such as switching between a landscape mode and a portrait mode or a pedometer.

The distance sensor 180F is configured to measure a distance. The terminal device too may measure a distance by using an infrared ray or a laser. In some embodiments, in a photographing scenario, the terminal device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The terminal device 100 emits infrared light by using the light-emitting diode. The terminal device 100 detects infrared reflected light from a nearby object by using the photodiode. When detecting sufficient reflected light, it may be determined that there is an object near the terminal device 100. When detecting insufficient reflected light, terminal device 100 may determine that there is no object near the terminal device 100. The terminal device 100 may detect, by using the optical proximity sensor 180G, that the user holds the terminal device 100 close to an ear for a call, so that the terminal device 100 automatically turns off the screen to save power. The optical proximity sensor 180G may also be used in a smart cover mode or a pocket mode to automatically perform screen unlocking or locking.

The ambient light sensor 180L is configured to sense ambient light brightness. The terminal device 100 may adaptively adjust brightness of the display 194 based on the sensed ambient light brightness. The ambient light sensor 180L may also be configured to automatically adjust white balance during photographing. The ambient optical sensor 180L may further cooperate with the proximity sensor 180G to detect whether the terminal device 100 is in a pocket, to avoid an accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy based on the temperature detected by the temperature sensor 180J. For example, when the temperature reported by the temperature sensor 180J exceeds a threshold, the terminal device 100 lowers performance of a processor located near the temperature sensor 180J, to reduce power consumption to implement thermal protection. In some other embodiments, when the temperature is less than another threshold, the terminal device 100 heats the battery 142 to prevent the terminal device 100 from being abnormally powered off because of a low temperature. In some other embodiments, when the temperature is less than still another threshold, the terminal device 100 boosts an output voltage of the battery 142, to prevent abnormal power-off caused by a low temperature.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. Visual output related to the touch operation may be provided through the display 194. In some other embodiments, the touch sensor 180K may alternatively be disposed on a surface of the terminal device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch-sensitive key. The terminal device 100 may receive key input, and generate key signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device 100. The terminal device 100 can support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with the external storage card. The terminal device 100 interacts with a network through the SIM card, to implement functions such as calling and data communication. In some embodiments, the terminal device 100 uses an eSIM, namely, an embedded SIM card. The eSIM card may be embedded in the terminal device 100, and cannot be separated from the terminal device 100.

Bluetooth Protocol System Framework

Figure 2:
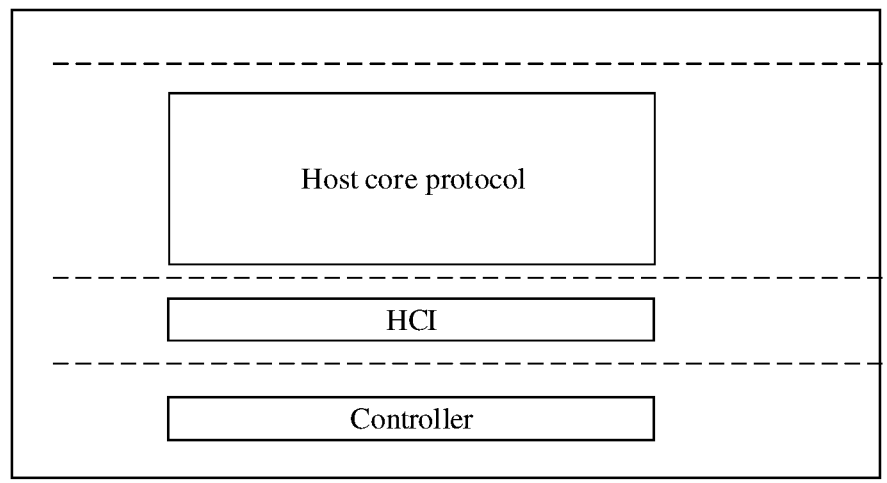
FIG. 2 is a Bluetooth protocol framework of a terminal device 100 according to this application.

As shown in FIG. 2, an embodiment of this application provides a Bluetooth protocol framework of a terminal device, including but not limited to a host (host) protocol stack, an HCI (Host Controller Interface), and a controller (controller).

The host protocol stack defines a plurality of profiles (profile) and core protocols (protocol) in a Bluetooth framework, each profile defines a corresponding message format and application rule, and the profile is a Bluetooth service (Application). To implement interconnection between devices on different platforms, the Bluetooth protocol defines specifications for various possible and universal application scenarios, such as an A2DP (advanced audio distribution profile) and an HFP (hands-free profile).

The core protocol includes but is not limited to a Bluetooth basic service discovery protocol SDP (Service Discovery Protocol), a logical link control and adaptation protocol L2CAP (Logical Link Control and Adaptation Protocol), and the like. The core protocol is essential to the Bluetooth protocol stack.

The HCI provides an upper-layer protocol with a unified interface for entering a link manager and a unified manner for entering a baseband. There are several transport layers between the host core protocol stack and the controller. These transport layers are transparent and complete a task of transmitting data. A Bluetooth special interest group (SIG) defines four physical bus modes to connect to hardware, that is, four HCI transport layers: USB, RS232, UART, and PC card.

The controller defines a bottom-layer hardware part, including a radio frequency (RF), a baseband (BB), and a link manager (LM). An RF layer filters and transmits data bit streams by using microwaves on a 2.4 GHz unlicensed ISM band, and mainly defines conditions that a Bluetooth transceiver needs to meet to work properly on this frequency band. The baseband is responsible for frequency hopping and transmission of Bluetooth data and information frames. The link manager is responsible for connection, establishment, and disconnection of links, and security control. An LM (Link Manager) layer is a link management layer protocol of the Bluetooth protocol stack, and is responsible for translating an upper-layer HCI command into an operation acceptable to the baseband, and establishing an asynchronous connection-oriented link (ACL), a synchronous connection-oriented/extended (SCO) link, and a working mode for enabling a Bluetooth device to enter an energy saving mode. An LC (Link Control) layer is responsible for responding to an upper-layer LM command during transmission of a batch of data packets (for example, executing LM commands for establishing a transmission link of a data packet and maintaining the link).

The method in this embodiment of this application may be implemented by the wireless communications module 160 of the terminal device 100 shown in FIG. 1, and may be specifically performed by a Bluetooth module or a Bluetooth chip.

Data Transmission Topology

Figure 3:
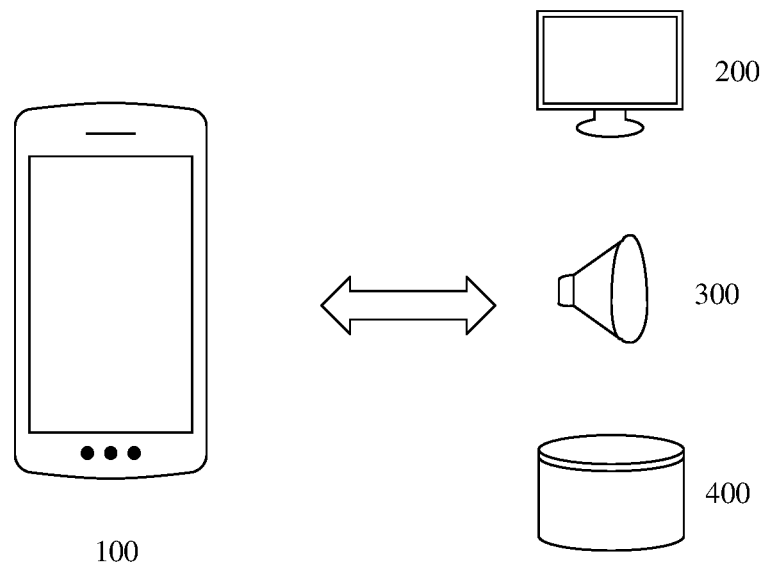
FIG. 3 is a schematic diagram of data transmission of a terminal device 100 according to this application.

FIG. 3 shows a possible data transmission manner of the terminal device 100.

As shown in FIG. 3, a Bluetooth technology is used as an example. The terminal device 100 is connected to a peer device. FIG. 3 shows three typical peer devices, such as a display device 200, an audio device 300, and a storage device 400. This embodiment is merely an example, but is not limited. After being connected to the display device 200, the terminal device 100 may send various types of data such as a text, a picture, a video, and audio to the display device 200. After receiving the data, the display device 200 may play the foregoing data such as the text, the picture, the video, and the audio.

In a possible embodiment, after being connected to the audio device 300, the terminal device 100 may play music online by using the audio device 300.

In a possible embodiment, the terminal device 100 may simultaneously send the data such as the text, the picture, the video, and the audio to a plurality of peer devices.

It should be noted that the display device, the audio device, and the storage device in this embodiment represent only terminal devices having functions of display, audio play, and storage. A smartphone is used as an example. The smartphone may be the display device, the audio device, or the storage device.

During data transmission, a short-distance communications technology may be used. A short-distance transmission technology described in this embodiment of this application includes but is not limited to: Zig-Bee, Bluetooth (Bluetooth), wireless broadband (Wi-Fi), ultra-wideband (UWB), near field communication (NFC), an IrDA infrared connection technology, UWB (Ultra Wideband), a digital enhanced cordless telecommunications (DECT) technology, and the like.

In data transmission, a packet loss rate, a retransmission rate, a received signal strength indicator (RSSI), a delay, a throughput rate, quality of service (QoS), a transmit power, a maximum transmit power, a minimum transmit power, a power range, and the like may be used to measure transmission quality or link quality, or another parameter may be used to measure data transmission quality. Usually, when channel quality deteriorates, the packet loss rate, the retransmission rate, or the like may be greater than a preset threshold, or when channel quality improves, the RSSI or the like may be greater than a preset threshold. This is not limited in this application.

A Bluetooth protocol described in this embodiment of this application may be a classic Bluetooth (ER/BDR) protocol, may be a Bluetooth low energy (BLE) protocol, or may be different Bluetooth protocol versions (for example, Bluetooth 3.0, 4.0, 5.0, and the like).

Bluetooth Technology Data Transmission

A Bluetooth transmission technology is widely used in the data transmission field due to characteristics of high transmission efficiency and convenience of use. To improve efficiency of Bluetooth transmission, a Bluetooth special interest group (SIG) formulates related protocols and regulations. Table 1 is a table of transmit power parameters of Bluetooth specified in the Bluetooth protocol.

| Power class | Maximum output power (Pmax) | Nominal output power | Minimum output power | Power control |
|---|---|---|---|---|
| 1 | 100 mW (20 dBm) | N/A | 1 mW (0 dBm) | Pmin < +4 dBm to Pmax |
| 2 | 2.5 mW (4 dBm) | 1 mW (0 dBm) | 0.25 mW (−6 dBm) | Optional: Pmin$^2$ to Pmax |
| 3 | 1 mW (0 dBm) | N/A | N/A | Optional: Pmin$^2$ to Pmax |

In the protocol, the terminal device is classified into three classes 20 dBm, 4 dBm, 0 dBm based on the maximum output (transmit) power, and a maximum transmit power class (mode) may reach 20 dBm. In the protocol, parameters such as the nominal output power, the minimum output power, and the power control are further specified. For example, when the power class is 1, the maximum output power is 20 dBm, the minimum output power is 0 dBm, and the power control (a power range of the peer device requested to increase or decrease) is between 4 dBm and 20 dBm. For details, refer to the Bluetooth protocol (for example, Bluetooth protocol 5.0).

In this embodiment of this application, when the Bluetooth reaches the maximum output power 20 dBm, it may be considered that the terminal device reaches a Bluetooth high-power mode (also referred to as a high-power mode, a maximum output power mode, a maximum transmit power mode, or the maximum output power). Similarly, when an output power of the Bluetooth reaches 4 dBm, it may be considered that the terminal device reaches a Bluetooth common-power mode (also referred to as a common mode, a common output power mode, a common transmit power mode, or a common output power). In addition, when the output power of the Bluetooth is 0 dBm, it may be considered that the terminal device is in a Bluetooth low-power mode (also referred to as a low-power mode, a minimum output power mode, a minimum transmit power mode, or a minimum output power). In this embodiment of this application, power classes of the Bluetooth may be further classified into at least two, for example, the high-power mode and the low-power mode. The power classes may be further classified into at least four: the high-power mode, a medium-high-power mode, a medium-low-power mode, and the low-power mode. The power class is not limited in this application.

In this embodiment of this application, the power class may be further defined based on the power range. For example, power output within a range of 1 dBm to 10 dBm may be defined as the low-power mode, 10 dBm to 20 dBm may be defined as the high-power mode, and 5 dBm to 10 dBm may be defined as the common-power mode.

In this embodiment of this application, considering that a common maximum output power of the terminal device in the industry is about 12 dBm to 14 dBm, the high-power mode of the terminal device may be greater than 14 dBm or greater than 12 dBm.

In this embodiment of this application, after the terminal device increases the transmit power, it may be considered that the terminal device is in the high-power mode or performs a data service in the high-power mode. Similarly, after the terminal device reduces the transmit power, it may be considered that the terminal device is in the low-power mode or performs the data service in the low-power mode.

The terminal device may be connected to a plurality of peer devices, and establish a physical link to each peer device. The terminal device may send data to the peer device in different power modes based on different physical links. For example, the terminal device 100 in FIG. 3 may be connected to both the display device 200 and the audio device 200. To be specific, the terminal device 100 may establish a first physical link to the display device 200 to transmit data, and the terminal device 100 may establish a second physical link to the audio device 300. The terminal device sends data to the audio device 300 in the high-power mode based on the second physical link.

Bluetooth Transmit Power Increase Transmission

Figure 4:
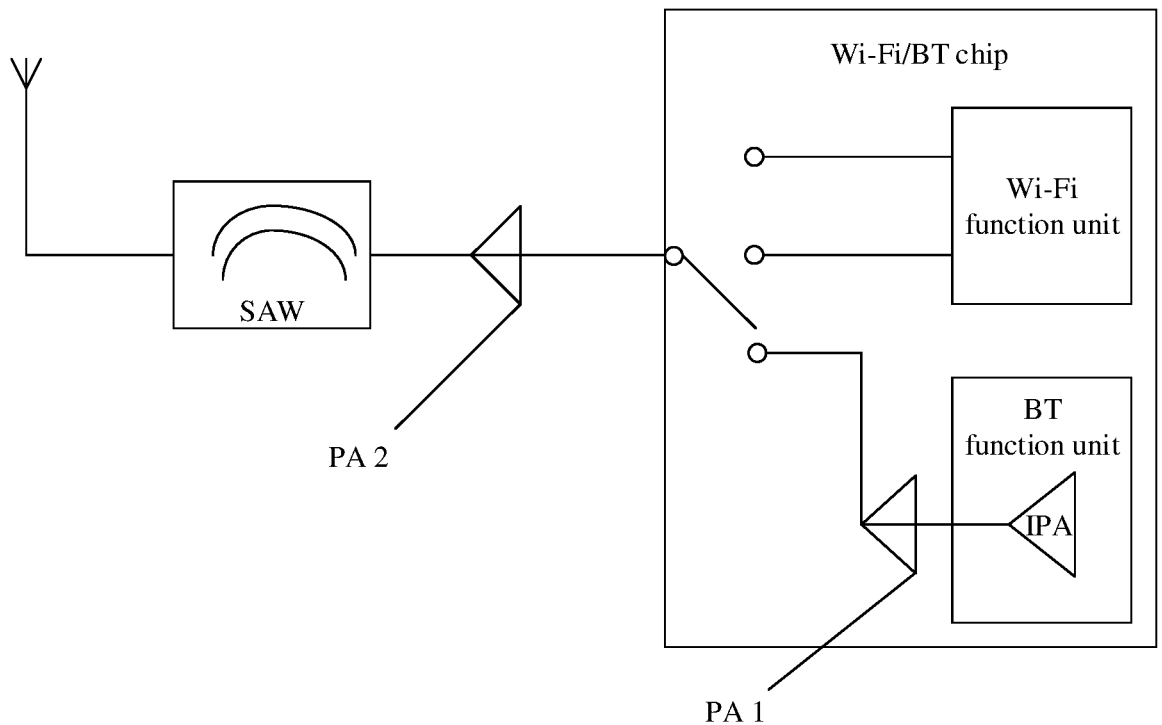
FIG. 4 is a second schematic structural diagram of a terminal device 100 according to this application.

To improve Bluetooth transmit power of the terminal device or enable the terminal device to be in the high-power mode, a plurality of manners may be used. In some possible embodiments, as shown in FIG. 4, at least one built-in power amplifier (PA) 1 may be added to the Bluetooth chip, so as to increase the transmit power of the terminal device, and increase a communication distance. The maximum transmit power of the Bluetooth is implemented by cascading the PA 1 and an IPA (built-in power amplifier). The IPA serves as an input stage of the PA 1 to provide an excitation signal to the PA 1, and a transmit power output by the PA 1 is the transmit power of the Bluetooth. It may be understood that the power of the PA 1 is greater than a transmit power of the IPA, thereby improving the power.

In a possible embodiment, at least one external PA 2 may be further added on a radio frequency channel, that is, outside the Bluetooth chip, so as to increase a transmit power of a product and increase the communication distance. A principle is the same as that in the foregoing embodiment. It may be understood that a power of the PA 2 is greater than the transmit power of the IPA.

FIG. 4 is merely an example for describing a manner in which a transmit power is increased by adding a PA, but is not intended to limit the present invention.

Figure 5:
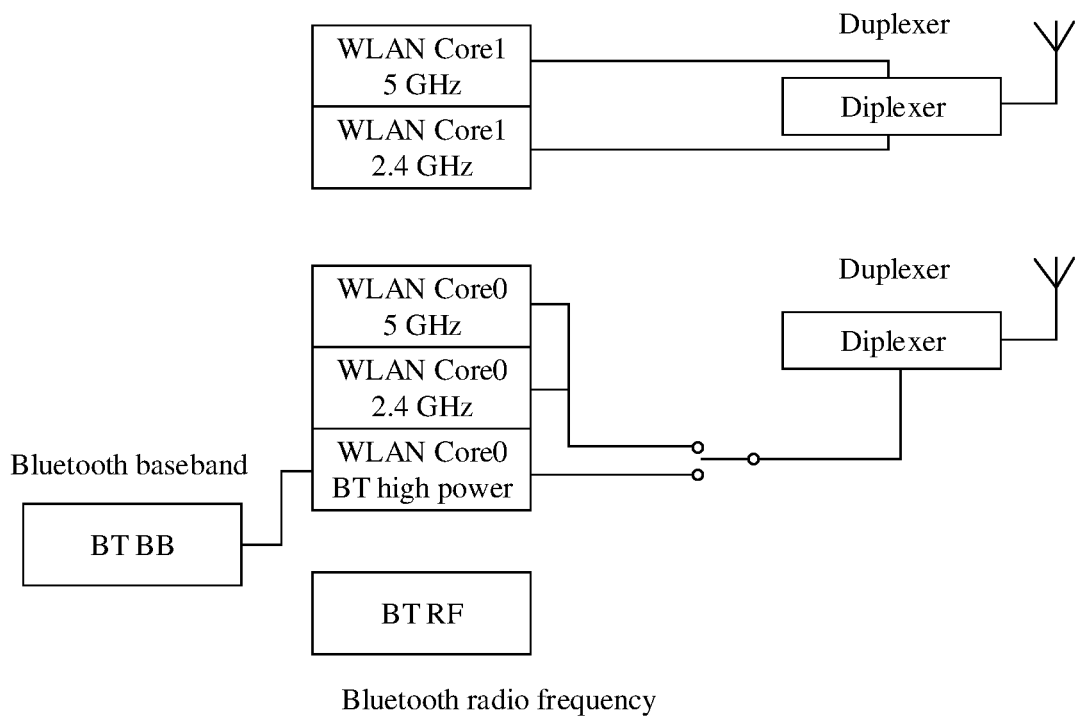
FIG. 5 is a third schematic structural diagram of a terminal device 100 according to this application.

In some embodiments, as shown in FIG. 5, a Bluetooth transmit power may be increased by multiplexing a Wi-Fi transmit channel. Generally, a transmit capability of a Wi-Fi PA is stronger than a transmit capability of a Bluetooth BT. Therefore, when high-power transmission is required for Bluetooth transmission, a PA of a Wi-Fi chip or a Wi-Fi function unit may be multiplexed, to reach a maximum output power.

Bluetooth may work in a low-power mode by default to reduce power consumption. A transmit channel of the Bluetooth works on an independent RF (radio frequency) channel of the Bluetooth. The RF channel includes radio frequency components such as a Bluetooth power amplifier and a filter. Based on a request of a peer device, when constraints of high power usage are met, power level switching is performed, and a high-power mode is enabled. That is, as shown in FIG. 5, a Bluetooth baseband is connected to a Wi-Fi radio frequency channel, so as to achieve an effect of increasing an output power.

Service-Based Bluetooth Transmit Power Switching

If the terminal device continuously performs data transmission in the high-power mode, power consumption is greatly increased, and in some scenarios, a requirement for quality of data transmission is usually not so high. In a process of using a Bluetooth service, the transmit power of the Bluetooth is dynamically adjusted based on a real-time status of the service, so as to improve service performance while keeping the power consumption as low as possible.

In some embodiments, whether the terminal device needs to increase or decrease the transmit power of the Bluetooth may be determined based on a service type currently performed by the terminal device, and the service type may include a Wi-Fi service, a cellular data service, or the like. For example, when the terminal device performs a cellular service (or performs only the Wi-Fi service), power consumption is relatively large. In this case, the Bluetooth may use a relatively low transmit power class, for example, class 2 in Table 2, that is, a common-power mode. When performing the cellular service and the Wi-Fi service, the terminal device may use a lowest transmit power class, for example, class 3 in Table 2, that is, the low-power mode. When the terminal device performs only a Bluetooth service, the terminal device may use a highest Bluetooth transmit power class, for example, class 1 in Table 2, that is, the high-power mode, as shown in Table 2.

TABLE 2

| Power class | Power mode | Wi-Fi service | Cellular service |
| --- | --- | --- | --- |
| 1 | High-power mode | Off | Off |
| 2 | Common-power mode | On (Off) | Off (On) |
| 3 | Low-power mode | On | On |

It should be noted that in this embodiment, different services may be combined to adjust the transmit power. For example, when the terminal device performs the Wi-Fi service and does not perform the cellular service, the high-power mode may be used. This is not limited in this embodiment of this application. In some possible embodiments, the Bluetooth power mode may be further switched based on a current scenario. A service scenario may be a music scenario, a video scenario, a screen projection scenario, a phone scenario, an image sharing scenario, a document sharing scenario, or the like. As shown in Table 3, in the music scenario, for example, a Bluetooth wireless headset is used to listen to music, because a user has a relatively high requirement for sound quality and a delay in the music scenario, a relatively high transmit power is required. In the image sharing scenario, for example, the user sends a picture to the peer device by using the terminal device. In this scenario, a requirement for transmission quality is relatively low, and the requirement of the user may be met by using the common-power mode or the low-power mode, as shown in Table 3.

TABLE 3

| Power class | Power mode | Service scenario |
| --- | --- | --- |
| 1 | High-power mode | Audio and video scenario |
| 2 | Low-power mode | Image sharing |

It should be noted that in this embodiment of this application, different power modes may be customized in different scenarios. In a possible mode, a graphical user interface may be provided for selection. For example, the user may set to use the common mode in the screen projection scenario, or use the high-power mode in the phone scenario.

In some embodiments, the terminal device may determine, with reference to the service type and the service scenario, whether to increase the Bluetooth transmit power, that is, may determine a service scenario in which a service type is currently performed, so as to adjust the Bluetooth power mode. As shown in Table 4:

TABLE 4

| Power class | Power mode | Service scenario | Service type |
|---|---|---|---|
| 1 | High-power mode | Audio and video scenario | Wi-Fi |
| 2 | Low-power mode | Image sharing | Wi-Fi |

When the user connects to the terminal device by using a Bluetooth headset, and listens to music or watches a video by using the Bluetooth headset, and when data of the music or the video is currently transmitted by using a Wi-Fi hotspot, the terminal device may send the data to the headset in the high-power mode.

When the user connects to the terminal device by using the Bluetooth headset, and listens to music or watches a video by using the Bluetooth headset, and when data of the music or the video is currently transmitted by using a cellular module, the terminal device may send the data to the headset in the low-power mode.

It should be noted that in this embodiment of this application, different power modes may be customized in different service scenarios and service types. In a possible embodiment, the graphical user interface may be provided for selection. For example, the user may set to use the common mode in the screen projection scenario and the Wi-Fi service, or use the low-power mode in the phone scenario and the cellular service. This can reduce power consumption and improve user experience.

Bluetooth Transmit Power Switching Based on a Class of Connected Device

In some embodiments, to reduce power consumption, the Bluetooth transmit power may be adjusted based on a class of the peer device. Usually, when the user transmits music, for example, when the peer device is an audio device such as a speaker or a headset, requirements for data transmission quality, a delay, and the like are relatively high. Therefore, the terminal device needs to perform high-power transmission to improve the data transmission quality. In some other scenarios, for example, a scenario in which the terminal device performs picture transmission or picture projection, usually, when the peer device is a device such as a display or a memory, the requirement for data transmission quality is relatively low. Therefore, a relatively low transmit power may be used.

In some embodiments, whether the peer device is an audio device may be determined based on a class of device (CoD) of the peer device. When scanning a peripheral peer device, the terminal device may perform an inquiry (inquiry) procedure specified in the Bluetooth protocol. In this procedure, the terminal device may send an identity (ID) broadcast packet in a broadcast manner. After receiving the ID broadcast packet, the peripheral peer device may reply with an inquiry response (inquiry response), for example, reply with an FHS packet (Filesystem Hierarchy Standard, FHS). The FHS packet carries class of device (CoD) information of the peer device, and based on the information, it may be determined whether the queried device is the audio device or a preset class of device.

Figure 6:
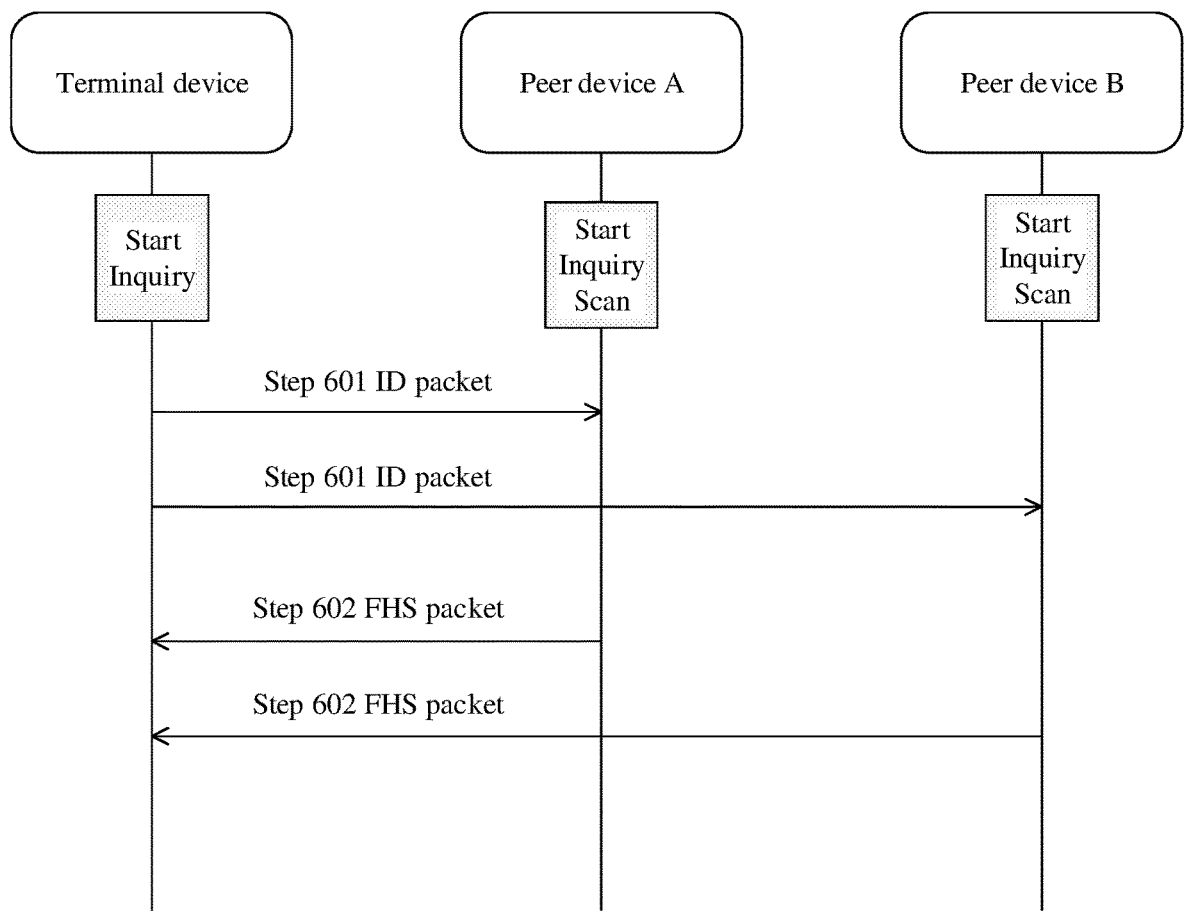
FIG. 6 is a first schematic diagram of Bluetooth power control according to this application.

Specifically, as shown in FIG. 6, a method for obtaining a CoD of a peer device by a terminal device is provided.

Step 601: After the terminal device enables a Bluetooth function (for example, a user turns on a Bluetooth switch on a settings interface of the terminal device), the terminal device may perform peer device inquiry. For example, the terminal device may send an ID packet to a plurality of peer devices in a surrounding range through an inquiry procedure of the Bluetooth protocol. The ID packet includes some parameter information of a current terminal device, for example, an identity, a MAC address, an IP address, another parameter used to represent a capability of the terminal device, and the like.

Step 602: After a peer device A and a peer device B receive the ID packet sent by the terminal device, for example, when the peer device is in an inquiry scan state, the peer device A and the peer device B may respond to the ID packet, for example, may send an FHS packet. The FHS packet may carry CoD information in the peer device, that is, class of device information. The CoD may be a class of device specified according to the Bluetooth protocol, as shown in Table 5.

TABLE 5

| Number | Major device classes (Major Device Classes) |
|---|---|
| 1 | Computer (computer) |
| 2 | Phone (phone) |
| 3 | LAN/Network access point (LAN/Network Access Point) |
| 4 | Audio/Video (audio/video) |
| 5 | Peripheral (Peripheral) |
| 6 | Imaging (imaging) |
| 7 | Wearable (wearable) |
| 8 | Toy (Toy) |
| 9 | Health (Health) |
| 10 | Others |

Table 5 lists some major device classes according to a Bluetooth standard protocol. In the protocol, a five-bit flag bit may be used to identify the major device class, for example, 00001 is used to identify the computer class, and 00010 is used to identify the phone class. For a specific device classes, refer to a Bluetooth standard.

In some embodiments, according to the Bluetooth protocol, the foregoing major device class may be further divided into minor classes. Using the audio/video class as an example, as shown in Table 6, the audio/video class may be divided into a plurality of minor classes.

TABLE 6

| Number | Minor device class field (minor device class field) |
|---|---|
| 1 | Wearable headset device (Wearable Headset Device) |
| 2 | Hands-free device (Hands-free Device) |
| 3 | Microphone (Microphone) |
| 4 | Loudspeaker (Loudspeaker) |
| 5 | Headphones (Headphones) |
| 6 | Portable audio (Portable Audio) |
| 7 | Car audio (Car audio) |
| 8 | Set-top box (Set-top box) |
| 9 | HiFi audio device (HiFi Audio Device) |
| 10 | Video recorder (VCR) |
| 11 | Video camera (Video Camera) |
| 12 | Camcorder (Camcorder) |
| 13 | Video monitor (Video Monitor) |
| 14 | Video display and loudspeaker (Video Display and Loudspeaker) |
| 15 | Video conferencing (Video Conferencing) |
| 16 | . . . |

Table 6 lists some minor classes in the audio and video class. In the protocol, a 6-bit flag bit may be used to identify the minor class. For example, 000001 is used to identify the wearable headset device, and 000010 is used to identify the hands-free device. For details, refer to a Bluetooth protocol specification.

In this application, the obtaining the CoD information in the peer device may include the major device class, or may include the minor device class. The class of device of the peer device may also be determined based on the major device class or the minor device class.

It should be noted that the response message of the peer device may carry the CoD information, and may further include a MAC address, an IP address, a device name, another parameter used to represent a capability of the peer device, and the like.

In some embodiments, in a process in which the terminal device and the peer device are paired and connected, the terminal device may obtain a capability parameter of the peer device, for example, obtain a type or a version number of a Bluetooth service (profile) supported by the peer device. The terminal device may determine the class of device of the peer device based on the type of the Bluetooth service supported by the peer device. For example, if the peer device supports an advanced audio distribution profile (A2DP) and/or a hands-free profile (HFP) service, it can be determined that the peer device is an audio/video device.

Generally, the profile defines a Bluetooth-based application. Each profile specification mainly includes a developer-specific interface, message format and standard (for example, audio compression), and components that use the Bluetooth protocol stack. Each profile corresponds to a UUID. A concept of the UUID in the Bluetooth is similar to a concept of a port in TCP/IP. Each UUID runs a service, and the Bluetooth service may be identified by using a universally unique identifier (UUID). Bluetooth services identified by different UUIDs are different, and each service corresponds to a universal, independent, and unique UUID. Common services are shown in Table 7.

TABLE 7

| UUID | Bluetooth service |
| --- | --- |
| A2DP_UUID | A2DP (Advanced Audio Distribution Profile) |
| HFP_UUID | HFP (Hands-Free Profile) |

A2DP_UUID indicates the A2DP advanced audio distribution profile. The A2DP defines parameters and procedures required for establishing audio and video streams. HFP_UUID indicates the HFP hands-free profile, providing basic functions required for communication between a phone and a headset.

In some embodiments, as shown in FIG. 6, after receiving the ID packet sent by the terminal device, for example, when the peer device is in the inquiry scan state, the peer device A and the peer device B may respond to the ID packet, for example, may send the FHS packet. The FHS packet may carry the CoD information in the peer device, and the FHS packet may further carry UUID information of a service supported by the peer device. For example, when the peer device supports the A2DP service, the FHS packet may carry the A2DP_UUID. Further, the terminal device may determine the class of device of the peer device based on the UUID.

In some embodiments, the terminal device may further perform a service discovery protocol (SDP) interaction operation with the peer device, so that the terminal device may directly send a Bluetooth service inquiry command to a Bluetooth chip of the peer device by using a Bluetooth chip of the terminal device.

Figure 7:
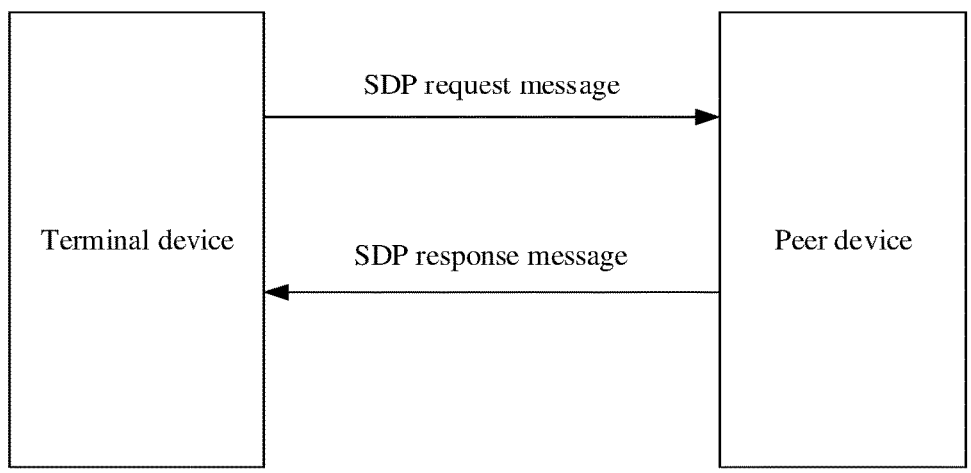
FIG. 7 is a second schematic diagram of Bluetooth power control according to this application.

As shown in FIG. 7, an embodiment of this application provides a method for querying, by using an SDP protocol, a service supported by a peer device.

Step 701: A terminal device sends an SDP request, for example, the terminal device queries whether the peer device supports a Hands-Free service, and the peer device may send an SDP_Service Search Attribute Request message. The SDP_Service Search Attribute Request message may carry a UUID of Hands-Free.

Step 702: After receiving the request of the terminal device, the peer device may reply with a found profile and a version number, for example, the UUID of Hands-Free and a version number of the Hands-Free.

In some embodiments, when the terminal device sends the SDP request, UUIDs carried in the SDP_Service Search Attribute Request message may be random or in a preset order. For example, the UUID of Hands-Free may be first carried.

When the peer device does not support the Hands-Free service, the SDP request may be sent again, and the SDP request carries a UUID of an A2DP. That is, in an SDP process, services supported by the peer device are queried one by one. Further, the terminal device determines a class of device of the peer device based on the services supported by the peer device.

In some other embodiments, in the method shown in FIG. 6, after obtaining CoD information of the peer device, the terminal device may further determine the services supported by the peer device, for example, the terminal device obtains a peripheral (Peripheral) device based on the CoD information. Further, a service type that may be supported by the peer device may be determined, for example, a Hands-Free or an A2DP service. Further, the SDP_Service Search Attribute Request message may be sent by using the method shown in FIG. 7. The message carries the UUID of Hands-Free. If the peer device does not support the Hands-Free service, the SDP request may be sent again, and the SDP request carries the UUID of the A2DP. In this way, the class of device of the peer device can be determined more accurately.

In some embodiments, the class of the peer device is identified by identifying the CoD class of the peer device or the service type supported by the peer device, and the terminal device enables or starts a high-power mode. For example, when the terminal device determines that the CoD class of the peer device is an (audio/video) class, which may be specifically a wearable headset device (Wearable Headset Device) class, the terminal device may determine that a current user may be listening to music by using a Bluetooth headset. Therefore, a transmit power may be increased, so that the terminal device is in the high-power mode, and the user has better user experience. For another example, when the terminal device determines that the peer device supports the A2DP service, the terminal device may determine that the peer device is a device related to an audio service. Therefore, the transmit power may be increased, so that the terminal device is in the high-power mode, and the user has better user experience.

It should be noted that the UUID mentioned in this application may be a basic UUID (128 bits), or may be a 16-bit UUID that replaces the basic UUID. For example, a basic UUID structure may be a BASE_UUID 0000 0000-0000-1000-8000-00805F9B34FB. For another example, a 16-bit UUID of a proxy basic UUID of an SDP service is 0x0001.

Enable Bluetooth High-Power Transmission

After the terminal device establishes a connection to the peer device based on a Bluetooth protocol, the terminal device establishes at least one physical link, for example, may be an asynchronous connection-oriented link (ACL). According to the Bluetooth protocol, the terminal device may allocate a link number (for example, connection handle number) to each ACL. The terminal device may increase the transmit power based on the link number.

In a possible embodiment, the transmit power may be further improved by identifying an identifier or a MAC address of the peer device.

In the foregoing embodiment, it may be determined, by identifying the CoD of the peer device and the service supported by the peer device, that the peer device needs to enable or disable the high-power mode of the terminal device. Specifically, a host may send an HCI command, and a controller specifically performs a corresponding operation.

Figure 8:
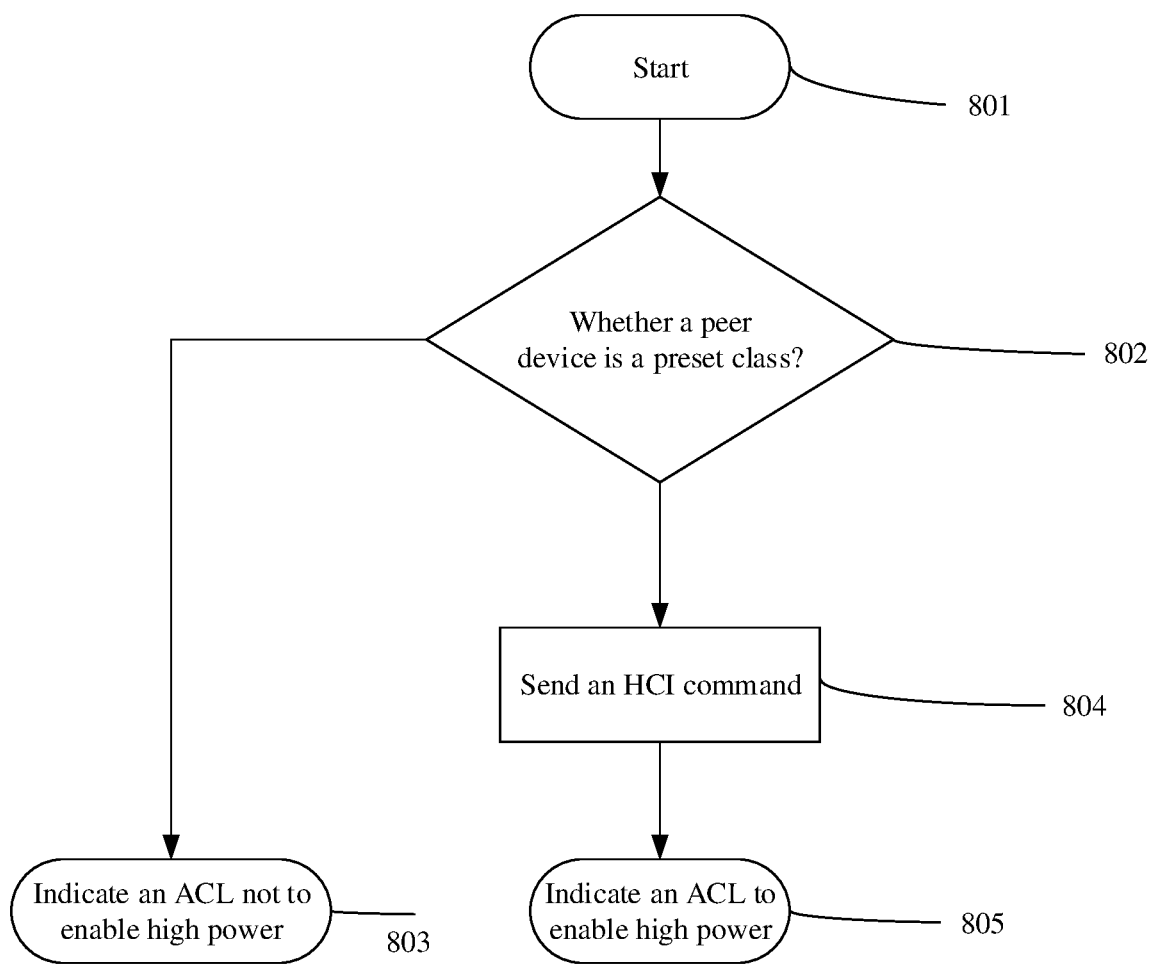
FIG. 8 is a third schematic diagram of Bluetooth power control according to this application.

As shown in FIG. 8, an embodiment of this application provides a method for enabling Bluetooth high power. Details are as follows:

Step 801: A terminal device obtains CoD information or UUID information of a peer device. For example, the terminal device may obtain, by using an inquiry procedure in a Bluetooth protocol or an SDP procedure, a UUID of a service supported by the peer device.

Step 802: The terminal device determines a class of device of the peer device, for example, the class of device of the peer device may be identified by using the foregoing method for identifying a CoD of the peer device and/or identifying a Bluetooth service supported by the peer device.

Step 803: When the terminal device determines that the peer device is a device of a non-preset class, the terminal device determines not to enable a high-power mode. Specifically, the terminal device may indicate, by using a controller, an ACL not to enable the high-power mode.

In a possible design, the terminal device may set a default or initial power mode to a low-power mode by using a user interface. When the terminal device determines that the peer device is a non-preset device (for example, a computer device), the controller may be triggered to indicate the ACL not to enable the high-power mode, to retain an original power mode, or not to trigger any action or instruction.

Step 804: When the terminal device determines that the peer device is a preset device (for example, an audio device), the terminal device determines that the high-power mode needs to be enabled. Specifically, the terminal device may configure an HCI command, so that the ACL link is allowed to transmit high power.

Step 805: The terminal device enables the high-power mode. Specifically, the controller may execute the HCI command to indicate the ACL link to enable high power.

Further, the terminal device sends a data packet to the peer device in the high-power mode.

It should be noted that, in step 805, the terminal device enables the high-power mode, and the terminal device may send the data packet to the peer device in the low-power mode, because another preset condition (for example, after channel quality meets a preset condition) may further need to be met before the terminal device can send the data packet to the peer device in the high-power mode.

It should be noted that the foregoing steps are not intended to limit an execution sequence. For example, step 803 may be performed before step 802. This is not limited in this application.

Figure 9:
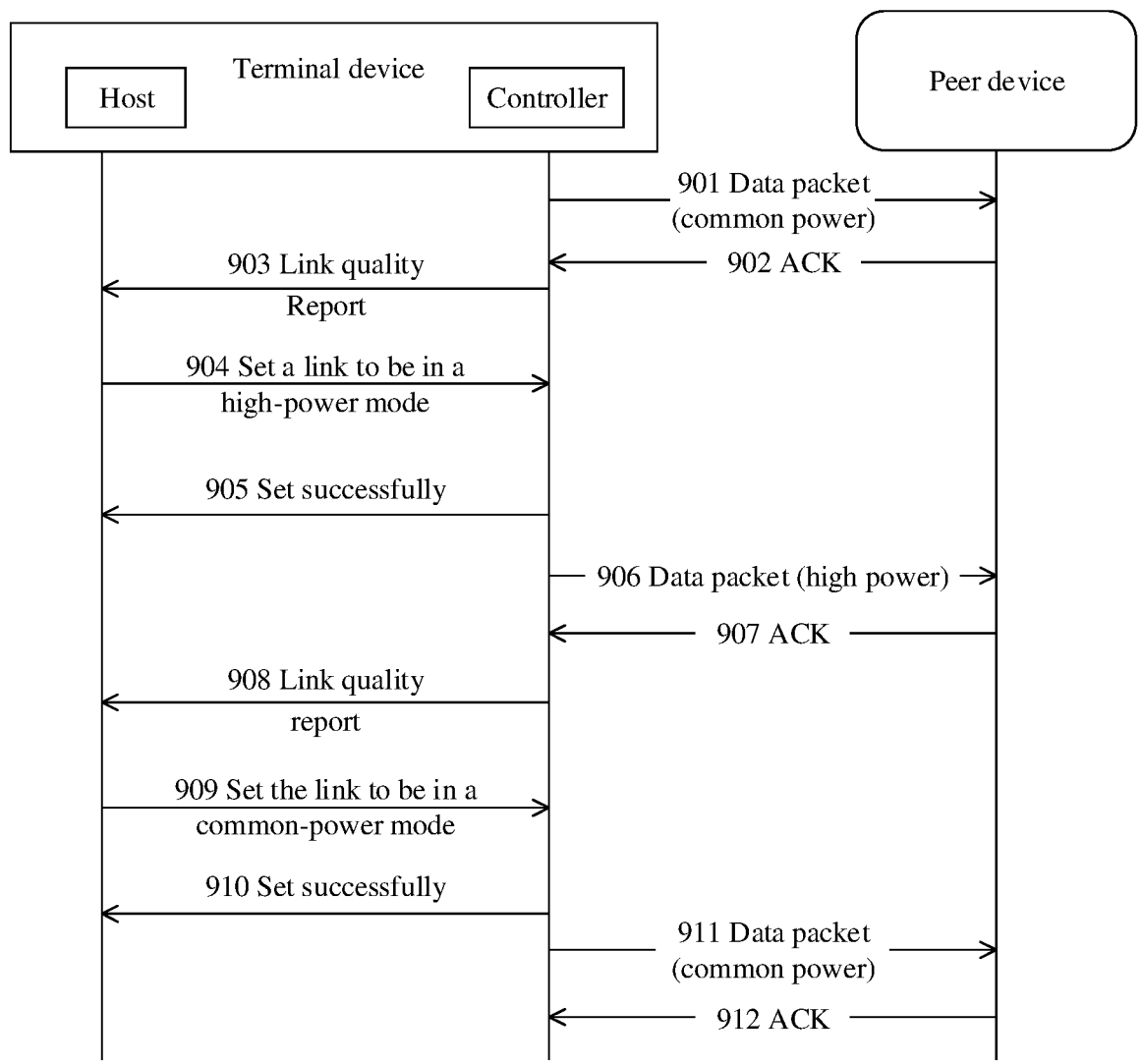
FIG. 9 is a fourth schematic diagram of Bluetooth power control according to this application.

After step 805, an embodiment of this application further provides a method for enabling a high-power mode by a terminal device, as shown in FIG. 9.

Step 901: After connecting to a peer device, the terminal device may send a data packet to the peer device. Specifically, the data packet may be sent to the peer device by using a controller, and the data packet may be sent in a common-power mode or a low-power mode.

The data packet in this application may be a data packet such as audio data, video data, or a file. In some embodiments, the data packet further includes some control commands or parameters.

Step 902: After receiving the data packet, the peer device may send a response (for example, an ACK) to the terminal device. In some embodiments, if the peer device does not receive the data packet or receives only some data packets, the peer device may also send a response message (for example, a NACK) to the terminal device. In some embodiments, it is possible that the peer device receives or does not receive the data packet, and the peer device does not reply with a response, for example, when link quality is poor or data is lost.

Step 903: The terminal device determines current link quality, and the quality of a current data transmission link may be determined by using parameters such as a packet loss rate, a quantity of retransmission times, a retransmission rate, and an RSSI (Received Signal Strength Indicator) value. In some embodiments, the link quality may be determined based on whether the peer device replies with the ACK or the NACK. For example, when the link quality is relatively good, the peer device may reply with the ACK after receiving the data packet. If the link quality is poor, the peer device usually does not receive the data packet or some data packets, and the peer device returns the NACK to the terminal device or the peer device has no response. The current link quality may be determined based on the response of the peer device, so as to further determine whether to enable the high-power mode. Specifically, the controller may report the link quality to a host.

Step 904: When the terminal device determines that the link quality meets a preset condition, the terminal device enables the high-power mode. Usually, the preset condition may be that the packet loss rate is greater than a preset value, the quantity of retransmission times is greater than a preset value, the retransmission rate is greater than a preset value, the RSSI is less than a preset value, or the like. Alternatively, the preset condition may be that another parameter used to measure the link quality in this embodiment of this application meets a threshold condition. Specifically, the host may send instructions to the controller to set an ACL link to enable the high-power mode.

Step 905: The terminal device sets the ACL link to enable the high-power mode.

Specifically, after receiving a command from the host to enable the ACL link, the controller of the terminal device returns a response message to the host.

Step 906: After setting the link to enable the high-power mode, the terminal device (specifically, the controller) may send the data packet to the peer device in the high-power mode.

It should be noted that, in the high-power mode, the terminal device may further receive the ACK or the NACK returned by the peer device, and further determine whether to continue to keep the high-power mode or adjust to the low-power mode.

A principle of step 907 to step 912 is the same as that of step 901 to step 906, and the terminal device may continue to detect the current link quality, so as to farther determine whether to switch to the common-power mode. Details are not described in this embodiment.

Dynamically Enable a High-Power Mode Based on a Peer Device

In an actual application, there may be a plurality of different classes of peer devices, and different classes of peer devices have different quality requirements for data transmission. For example, some peer devices such as a keyboard and a mouse are devices usually used only in a short distance. For a headset, a speaker, or a vehicle-mounted device, because music and calls are services that require high real-time performance and may be used in a long distance or block scenario, a high-power mode is required to improve service stability in the long distance or block scenario.

Generally, the peer device may actively send a request to a terminal device based on data transmission quality, to request the peer device to reduce or provide transmit power, or request the terminal device to enter a high transmit power mode or a low transmit power mode.

Figure 10:
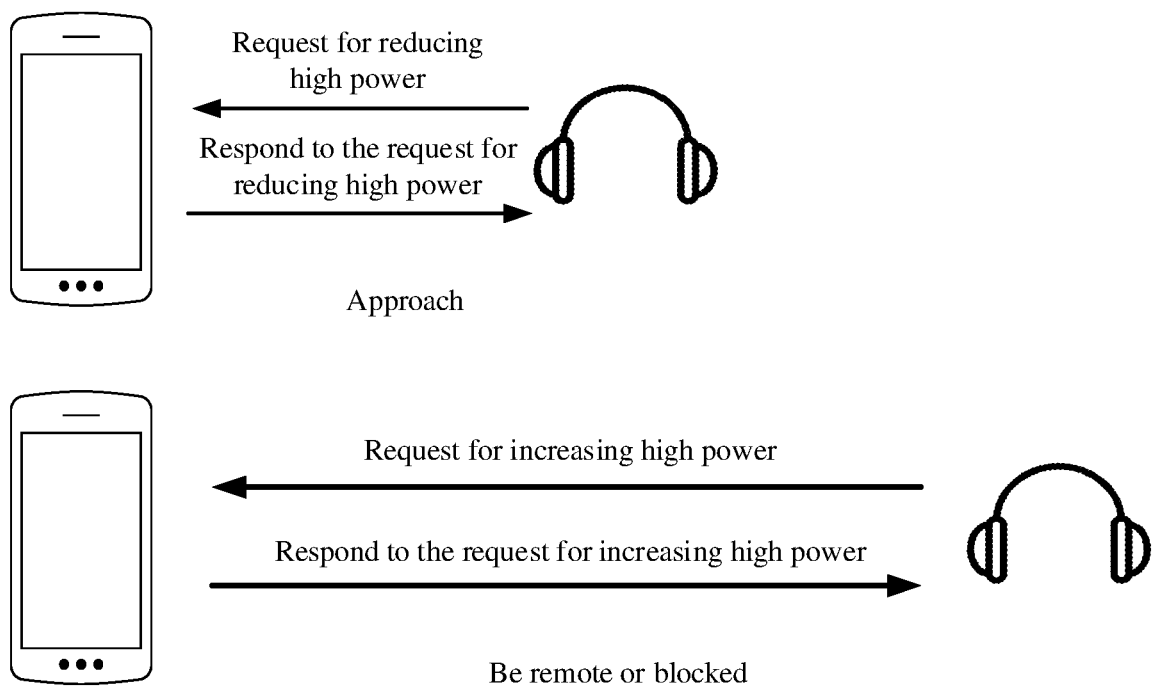
FIG. 10 is a fifth schematic diagram of Bluetooth power control according to this application.

Specifically, as shown in FIG. 10, after a terminal device establishes a connection to a peer device (for example, a headset), the terminal device may send data to the peer device. When the peer device detects that quality of a data transmission link deteriorates (for example, being remote or blocked), the peer device may send a request to the terminal device, for example, the sent request is LMP_Power_Control_req. The request is used to request the terminal device to increase transmit power. For example, the request may carry requesting to increase an order of magnitude of a specific power, for example, increase the transmit power by 10% (one step up) or require to increase by 4 dBm, or requesting the terminal device to transmit at a maximum transmit power (max power), or increasing a transmit power class.

In some embodiments, after connecting to the terminal, some peer devices may immediately send a request to the terminal device, for example, directly send LMP_Power_Control_req to the terminal device, so that the terminal device sends a data packet in a high-power mode.

After receiving the request of the peer device, the terminal device replies with a response message to the peer device. For example, the terminal device may reply with LMP_Power_Control_Res. Further, the terminal device increases the transmit power.

Similarly, the peer device may also send a request message to the terminal device, to reduce the transmit power of the terminal device, for example, request to reduce the transmit power by 10%, or request the terminal device to transmit data at a minimum transmit power, or reduce the transmit power class.

It should be noted that, in some embodiments, after receiving the request of the peer device for increasing the transmit power, the terminal device determines whether to increase the transmit power. For example, the terminal device needs to obtain a maximum transmit power that can be currently supported by the terminal device and obtain a transmit power currently used by the terminal device, and determines whether to increase the transmit power based on the supported maximum transmit power and the currently used transmit power. For example, the maximum transmit power that can be supported by the terminal device is 14 dBm, the transmit power currently used by the terminal device is 12 dBm, and the peer device requests to increase the transmit power by 4 dBm. In this case, the terminal device may not increase the transmit power, because the transmit power has exceeded the maximum transmit power that can be supported by the terminal device. The terminal device may further increase the transmit power by 2 dBm, to reach the maximum output power that can be supported by the terminal device. In some embodiments, the terminal device further needs to determine whether the terminal currently supports the high-power mode. In some embodiments, when the terminal device receives a request of the peer device, where the request is used to increase the transmit power of the terminal device, for example, increase by 4 dBm, the terminal device further needs to determine whether a power class of the terminal device needs to be increased based on a current actual transmit power and a transmit power that needs to be increased. For example, the actual transmit power of the terminal device is 12 dBm, and the peer device requests to increase the transmit power by 4 dBm, if the terminal device defines that the transmit power is greater than 14 dBm as the high-power mode, the terminal device does not need to switch to the high-power mode, or if the terminal device defines that the transmit power is greater than or equal to 12 dBm as the high-power mode, the terminal device needs to switch to the high-power mode. In this case, it may be understood that a terminal device has two level modes. For example, when the transmit power is greater than 14 dBm, it can be defined as the high-power mode. When the increased transmit power (the actual transmit power is added to the to-be-increased transmit power requested by the peer device) is greater than 14 dBm, the transmit power level needs to be increased, for example, the method shown in FIG. 4 or FIG. 5 is used.

Figure 11:
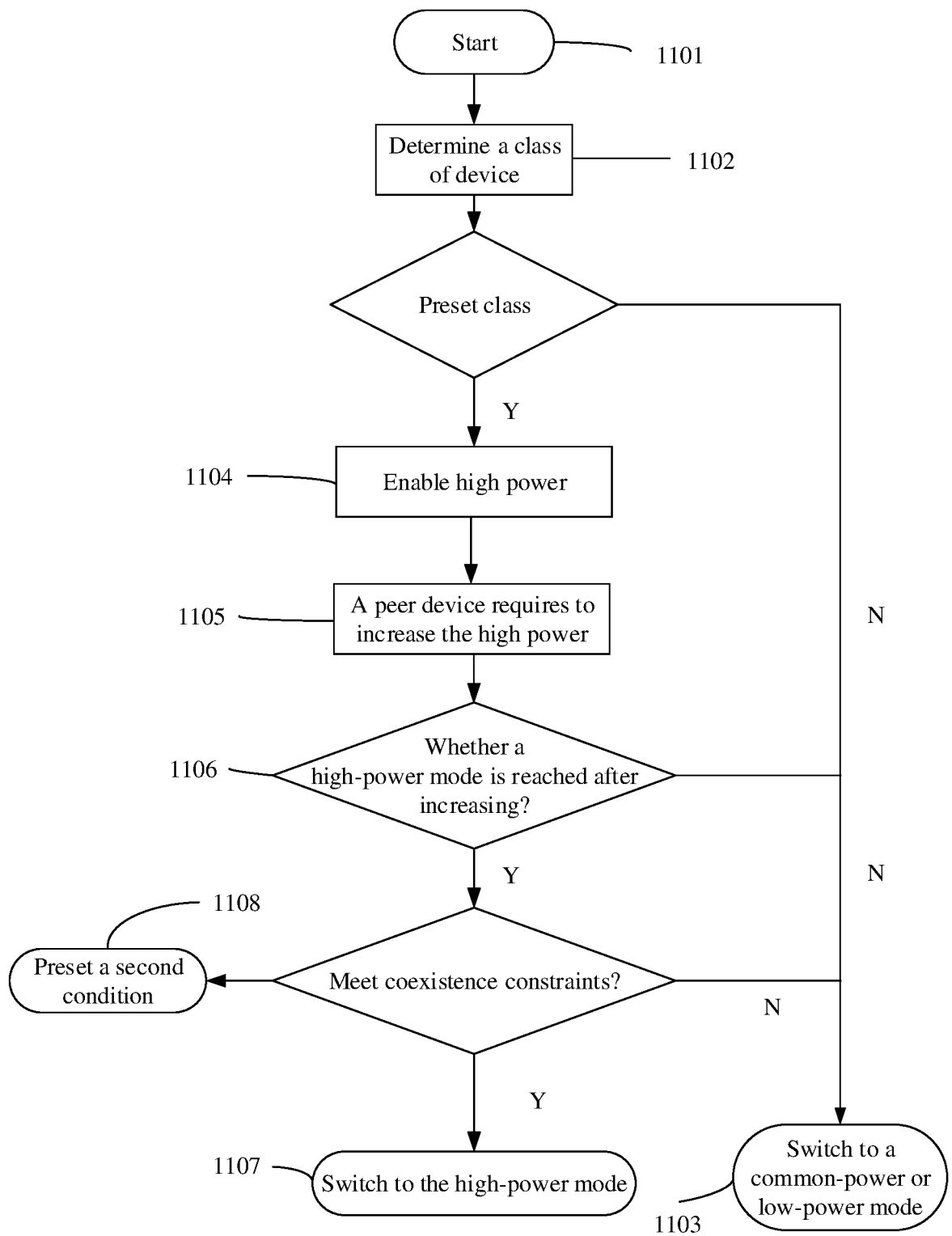
FIG. 11 is a sixth schematic diagram of Bluetooth power control according to this application.

In a possible embodiment, for a headset or a speaker device, a mobile phone side high-power mode may be further dynamically enabled based on a request of a peer end, as shown in FIG. 11.

Step 1101: A terminal device obtains CoD information or UUID information of a peer device. For example, the terminal device may obtain the CoD information or the UUID information of the peer device by using an inquiry procedure in a Bluetooth protocol or an SDP procedure, as the methods shown in FIG. 6 and FIG. 7.

Step 1102: The terminal device determines a class of device of the peer device. The class of device may be determined by identifying a CoD class and a supported service type of the peer device. In some embodiments, the class of device of the peer device may be defined as a high-power device and a low-power device. For example, an audio class may be defined as the high-power device, and a computer class may be defined as the low-power device. This is not limited in this embodiment of this application, and may be customized based on a vendor or a user. In some embodiments, the peer device may be further classified into a plurality of classes of power devices, for example, the high-power device, a medium-power device, and the low-power device, as shown in Table 8:

TABLE 8

| Device class | Specific class |
| --- | --- |
| High-power device | Audio |
| Low-power device | Computer |

It should be noted that different classes of device may be customized by a user based on the high-power device class in the foregoing table, and for a specific device class, refer to a device class specification or a CoD class in the foregoing Bluetooth protocol.

Therefore, this embodiment of this application may be extended to determine whether the class of device of the peer device is a predetermined class of device. If the class of device of the peer device is the predetermined class of device, the terminal device may increase transmit power or enable a high-power mode.

Step 1103: If it is determined that the peer device is not a device of a specified class, the peer device does not need to be in the high-power mode, and switches to a low-power mode. If the terminal device is currently already in the low-power mode, the terminal device continues to keep in the low-power mode. The user can also customize an initial mode. The initial mode may be the high-power mode or the low-power mode by default.

Step 1104: If it is determined that the peer device is the device of the specified class, the terminal device enables the high-power mode. Specifically, a controller may enable high power for an ACL.

Step 1105: Receive a request of the peer device for increasing the transmit power, for example, may be LMP_Power_Control_Req. The request is used to request the peer device to increase the transmit power. For example, the request may carry requesting to increase an order of magnitude of a specific power, for example, increase the transmit power by 10% (one step up), may further be requesting the terminal device to transmit at a maximum transmit power (max power), and may further be increasing a transmit power class. Generally, the peer device may determine link transmission quality based on a link parameter, for example, an RSSI value, and when the link parameter is less than a preset threshold, LMP_Power_Control_Req may be sent to the peer device.

Step 1106: The terminal device determines whether the high-power mode is reached after power is increased. In some embodiments, after receiving the request of the peer device for increasing the transmit power, the terminal device determines whether to increase the transmit power. For example, the terminal device needs to obtain a maximum transmit power that can be currently supported by the terminal device and obtain a transmit power currently used by the terminal device, and determines whether to increase the transmit power based on the supported maximum transmit power and the currently used transmit power. For example, the maximum transmit power that can be supported by the terminal device is 14 dBm, the transmit power currently used by the terminal device is 12 dBm, and the peer device requests to increase the transmit power by 4 dBm. In this case, the terminal device may not increase the transmit power, because the transmit power has exceeded the maximum transmit power that can be supported by the terminal device. The terminal device may further increase the transmit power by 2 dBm, to reach the maximum output power that can be supported by the terminal device. For another example, when the current transmit power of the terminal device is 8 dBm, the peer device requests to increase the transmit power by 4 dBm, and the terminal device defines that the transmit power is greater than 14 dBm as the high-power mode, an upgrade to the high-power mode is not met, and step 1103 may be performed. In some embodiments, when the terminal device receives a request of the peer device, where the request is used to increase the transmit power of the terminal device, for example, increase by 4 dBm, the terminal device further needs to determine whether a power class of the terminal device needs to be increased based on a current actual transmit power and a transmit power that needs to be increased. For example, the actual transmit power of the terminal device is 12 dBm, and the peer device requests to increase the transmit power by 4 dBm, if the terminal device defines that the transmit power is greater than 14 dBm as the high-power mode, the terminal device does not need to switch to the high-power mode, or if the terminal device defines that the transmit power is greater than or equal to 12 dBm as the high-power mode, the terminal device needs to switch to the high-power mode. In this case, it may be understood that a terminal mode has two class modes (the high-power mode and the low-power mode) and two levels (a high-power level and a low-power level). For example, when the transmit power is greater than 14 dBm, it can be defined as the high-power mode. When the increased transmit power (the actual transmit power is added to the to-be-increased transmit power requested by the peer device) is greater than 14 dBm, the transmit power level needs to be increased, for example, the method shown in FIG. 4 or FIG. 5 is used.

In some embodiments, it may be considered that in the low-power mode, the transmit power of the terminal device is in a specific range, for example, 0 dBm to 14 dBm, and it may be considered that a maximum transmit power of a Bluetooth chip is 14 dBm. If the current actual transmit power of the terminal device is 10 dBm, and the peer device requests to increase the transmit power by 5 dBm or 50%, the terminal device determines that the current actual transmit power plus the to-be-increased transmit power requested by the peer device exceeds the maximum transmit power of the Bluetooth chip. Further, the transmit power may be increased in the manner shown in FIG. 4 or FIG. 5, for example, may reach 14 dBm to 20 dBm. In this case, the terminal device may be in the high-power mode. In the high-power mode, the terminal device adjusts the transmit power, for example, 15 dBm, and transmits data to the peer device at the transmit power of 15 dBm.

Step 1107: After the terminal device meets the high-power mode after being upgraded, the terminal device changes a transmit power mode, and adjusts a current power mode to the high-power mode. That is, the terminal device switches to the high-power mode, and sends a data packet to the peer device in the high-power mode.

The foregoing steps are not intended to limit a method execution sequence. In some embodiments, when connecting to the peer device, the terminal device may obtain CoD information and a service type of the peer device. After the terminal device is connected to the peer device, data may be sent to the peer device in a default or initial power mode (for example, the low-power mode). When channel link quality deteriorates, for example, when the link parameter is less than the preset threshold, the terminal device receives a request of the peer device to change the power mode, for example, to increase the transmit power. The terminal device responds to the request, and the terminal device sends the data packet to the peer device in the high-power mode.

In some embodiments, for example, step 1108: In consideration of impact of a Wi-Fi service on a Bluetooth service, whether to increase the transmit power may be further determined based on usage of the Wi-Fi service. For example, after the request of the peer device for increasing the transmit power is received, it may be further determined whether Wi-Fi coexistence constraints are met. For example, in some cases, a Bluetooth high-power mode is implemented in a manner of multiplexing a Wi-Fi channel shown in FIG. 4. If the Wi-Fi service cannot receive or send data in the Bluetooth high-power mode, for example, if the Wi-Fi service needs to perform key frame receiving or sending, or current Wi-Fi performs a real-time service such as VoWi-Fi (Voice over Wi-Fi), the Bluetooth high-power mode may not be switched to. Therefore, in this implementation, a problem of coexistence of Bluetooth high power and Wi-Fi needs to be considered.

Enable a High-Power Mode Based on a Terminal Device

Figure 12:
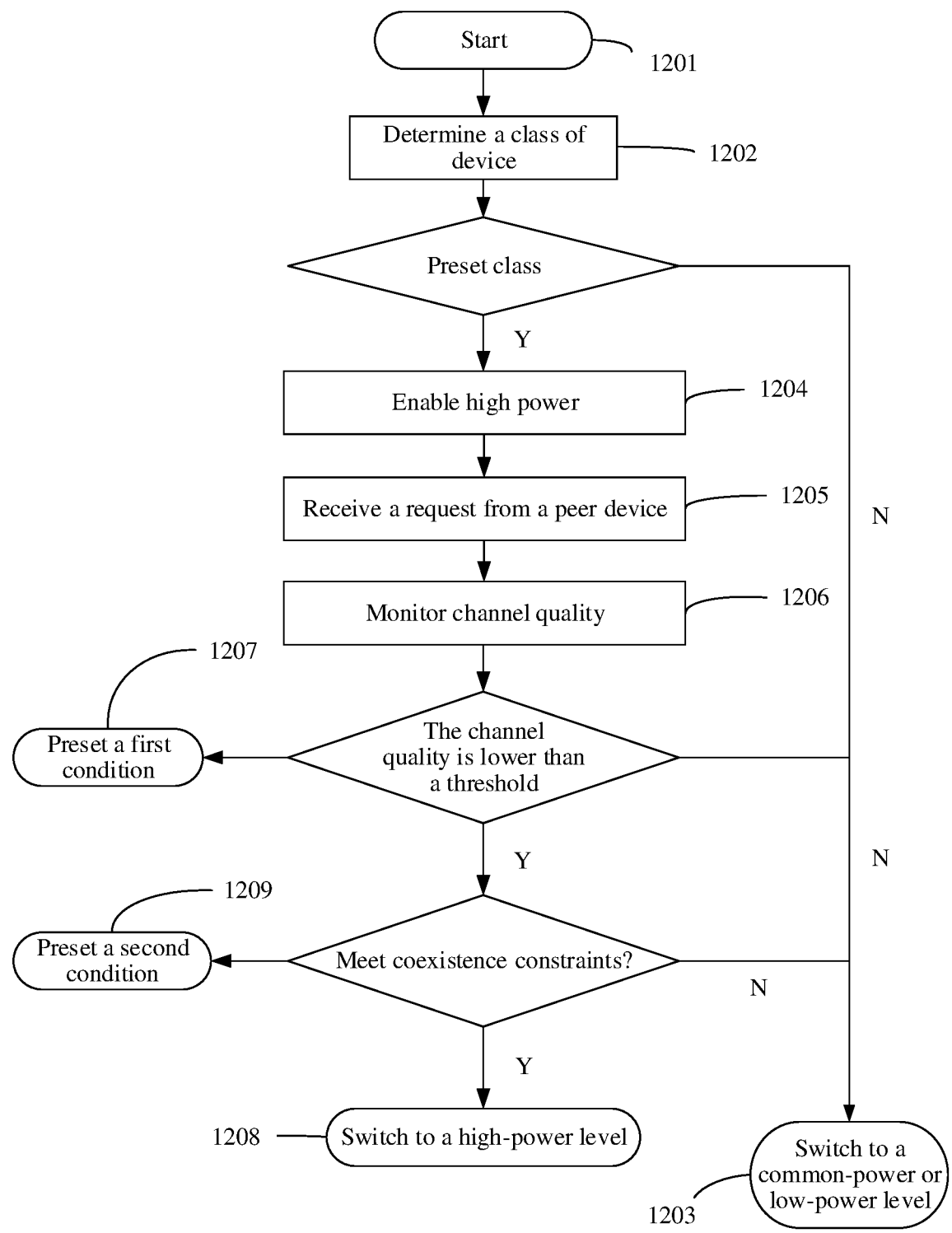
FIG. 12 is a seventh schematic diagram of Bluetooth power control according to this application.

Some peer devices may immediately send an LMP Max Power request to a mobile phone after an ACL link is established, and may not send any power reduction requests. As a result, the mobile phone keeps in a high-power transmission mode. Considering that this case causes unnecessary power consumption waste, another solution in which a terminal device unilaterally determines whether to send data in a high-power mode without depending on the request of the peer device is provided. Specifically, in the method, a condition for enabling high power is no longer determined based on the request of the peer device, but the terminal device determines, based on parameters such as an RSSI (Received Signal Strength Indicator) of a signal of the peer device, a quantity of retransmissions, and a packet loss rate, whether to use high-power transmission. As shown in FIG. 12:

Step 1201: A terminal device obtains CoD information or UUID information of a peer device. For example, the terminal device may obtain, by using an inquiry procedure in a Bluetooth protocol or an SDP procedure, a UUID of a service supported by the peer device.

Step 1202: The terminal device determines a class of device of the peer device. The class of device may be determined by identifying a CoD class and a supported service type of the peer device.

Step 1203: If it is determined that the peer device is not a device of a specified class (for example, the transmit power may be set to increase when the peer device is an audio device), the peer device does not need to be in a high-power mode, and switches to a low-power mode. If the terminal device is currently in the low-power mode, the terminal device continues to keep in the low-power mode. The user can also customize an initial mode. The initial mode may be the high-power mode or the low-power mode by default.

Step 1204: If it is determined that the peer device is the device of the specified class (for example, the audio device), the terminal device enables high power. Specifically, a controller may enable the high power for the ACL.

Step 1205: Receive a request of the peer device for increasing the transmit power, for example, may be LMP_Power_Control_Req. The request is used to request the peer device to increase the transmit power. For example, the request may carry requesting to increase an order of magnitude of a specific power, for example, increase the transmit power by 10% (one step up), may further be requesting the terminal device to transmit at a maximum transmit power (max power), and may further be increasing a transmit power class.

Step 1206: The terminal device starts to detect link quality of the ACL. Parameters such as a packet loss rate, a retransmission rate, a received signal strength indicator (RSSI), a delay, a throughput rate, quality of service (QoS), a transmit power, a maximum transmit power, a minimum transmit power, and a power range may be used to measure transmission quality or link quality.

Step 1207: Switch to the high power if it is determined that channel quality meets a preset condition. For example, the preset condition may be when the RSSI is lower than a threshold, and/or when a quantity of any consecutive retransmissions exceeds a threshold. If the preset condition is not met, the terminal device keeps in the low-power mode. Refer to step 1203.

Step 1208: The terminal device switches to the high-power mode, and sends a data packet to the peer device in the high-power mode.

In some embodiments, step 1209: In consideration of impact of a Wi-Fi service on a Bluetooth service, whether to increase the transmit power may be further determined based on usage of the Wi-Fi service. For example, after the request of the peer device for increasing the transmit power is received, it may be further determined whether Wi-Fi coexistence constraints are met. For example, in some cases, a Bluetooth high-power mode is implemented in a manner of multiplexing a Wi-Fi channel shown in FIG. 4. If the Wi-Fi service cannot receive or send data in the Bluetooth high-power mode, for example, if the Wi-Fi service needs to perform key frame receiving or sending, or current Wi-Fi performs a real-time service such as VoWi-Fi (Voice over Wi-Fi), the Bluetooth high-power mode may not be switched to. Therefore, in this implementation, a problem of coexistence of Bluetooth high power and Wi-Fi needs to be considered.

In some implementations, step 1205 is optional, that is, the terminal device may monitor the channel quality, to determine whether to increase the transmit power.

It should be noted that this embodiment of this application is also applicable to a power reduction method, and principles and steps thereof may be the same as the power increase method described in this embodiment of this application.

Figure 13:
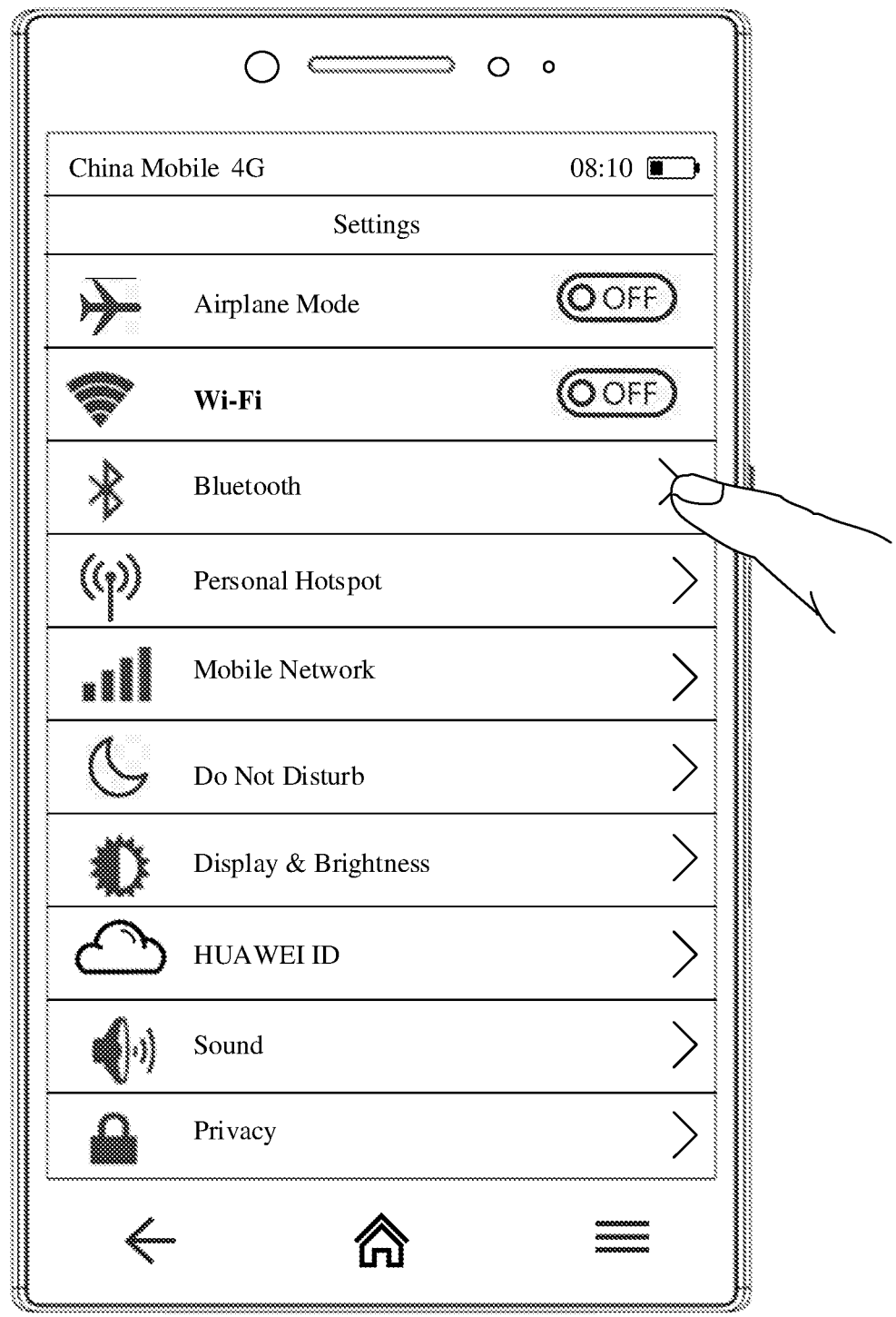
FIG. 13 is a diagram of a first user interface of Bluetooth power according to this application.
Figure 14:
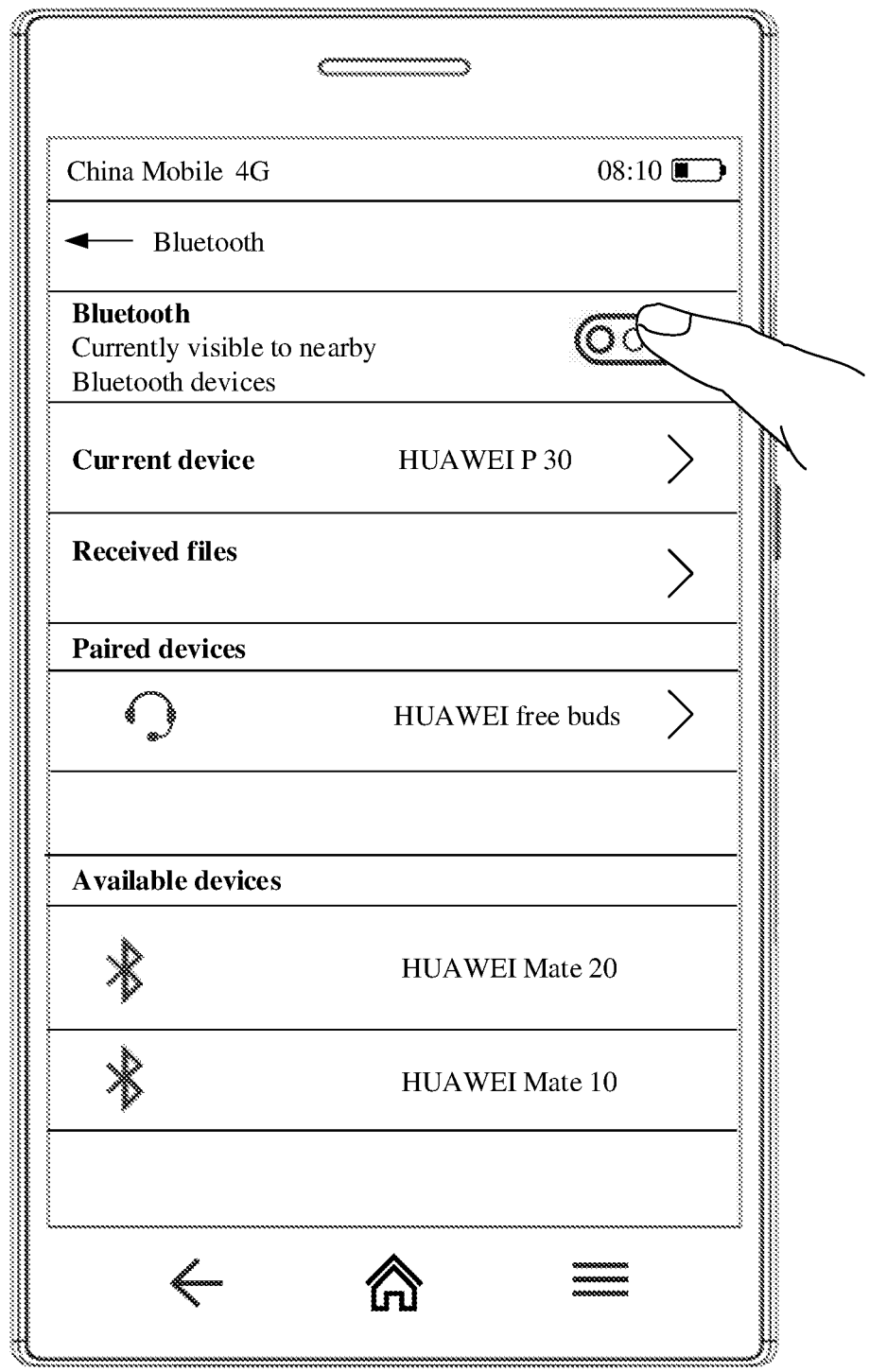
FIG. 14 is a diagram of a second user interface of Bluetooth power according to this application.

Method for Switching Between a High-Power Mode and a Low-Power Mode Based on a User Selection and Graphical User Interface In some implementations, a method for customizing a high-power mode by a user may be provided. As shown in FIG. 13, a terminal device displays a settings interface. In the settings interface, an operation of the user may be received to set Wi-Fi, a mobile network, a do not disturb mode, and the like. When an operation performed by the user on a Bluetooth option setting is received, a second interface may be displayed. As shown in FIG. 14, a user interface of Bluetooth settings may be displayed. The interface includes a Bluetooth switch, configured to enable or disable a Bluetooth function of the terminal device; further includes information about the terminal device, for example, a device name and an identifier; includes a Bluetooth device that has been paired with the terminal device, for example, a headset HUAWEI free buds shown in the figure; and further includes a plurality of surrounding peer devices obtained through scanning, such as HUAWEI Mate 20 and HUAWEI Mate 10. The user can tap a scanned terminal device for pairing, or connect to a paired device.

Figure 15:
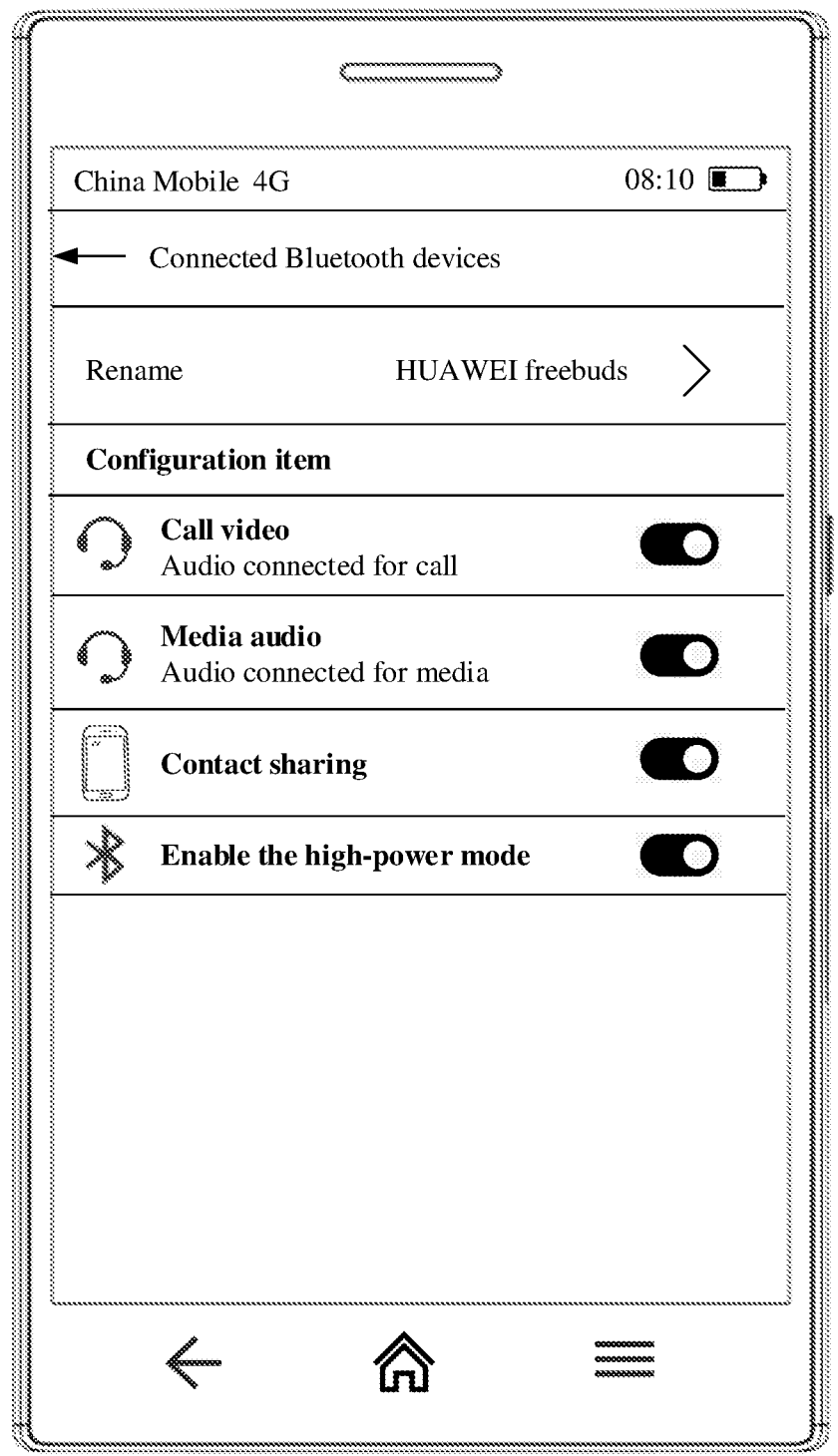
FIG. 15 is a diagram of a third user interface of Bluetooth power according to this application.

The terminal device detects that the user performs an operation on the "paired device", for example, an operation on HUAWEI free buds, and the terminal device displays an interface shown in FIG. 15. The interface may be set for the paired device, for example, the paired device may be renamed. The interface further includes a call video switch, a media audio switch, a contact sharing switch, and a whether to enable a high-power mode switch. For example, after receiving an instruction of the user to enable the high-power mode, the terminal device may send a data packet to the headset HUAWEI free buds based on the high-power mode.

Figure 16:
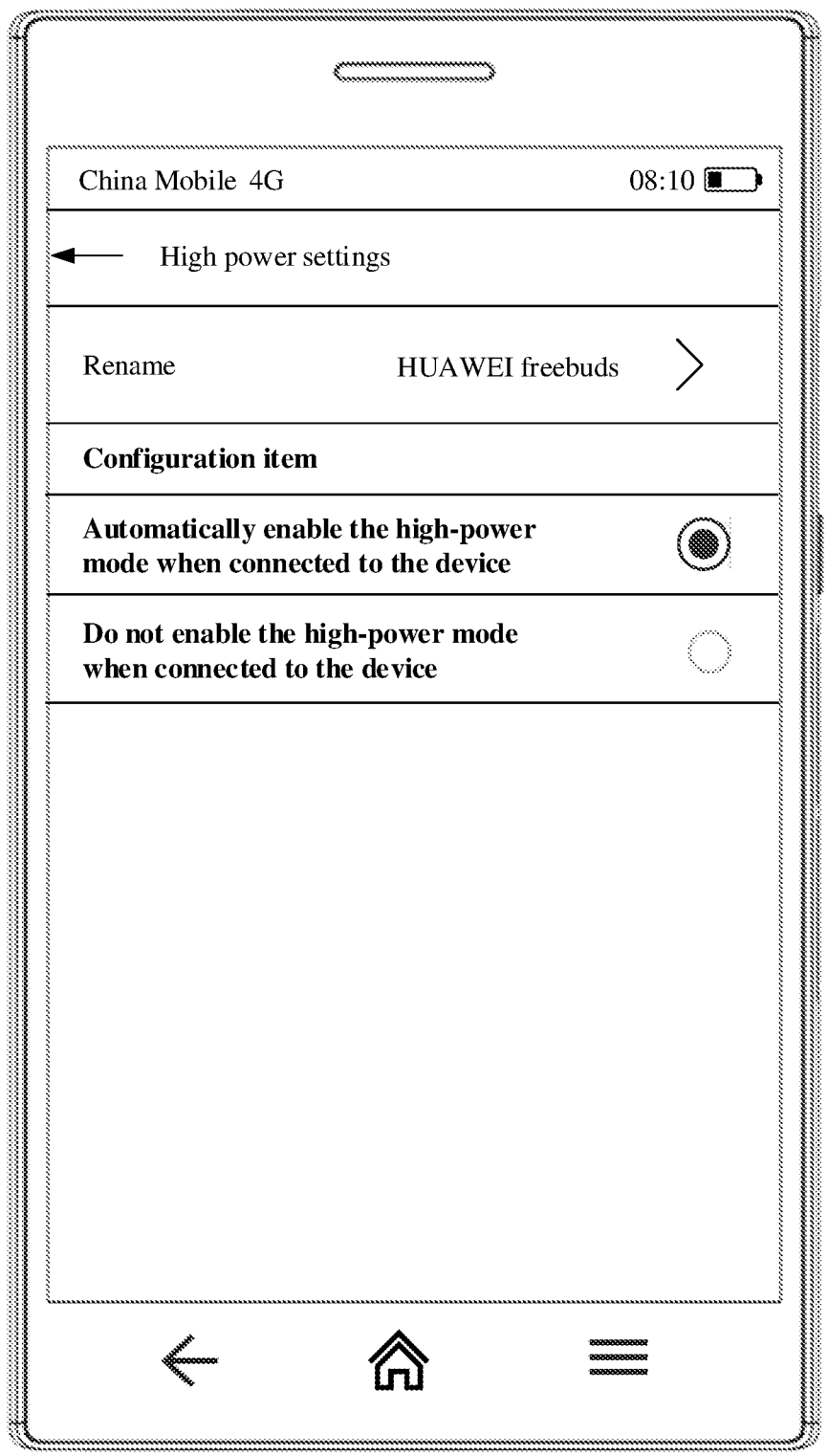
FIG. 16 is a diagram of a fourth user interface of Bluetooth power according to this application.

In some embodiments, as shown in FIG. 16, another high power settings interface is displayed, and a high power setting may be performed on the paired device, including a renaming operation on the paired device. An option "Automatically enable the high-power mode when connected to the device" or "Do not enable the high-power mode when connected to the device" can be set. When the terminal device is connected to the headset HUAWEI free buds, the terminal device may automatically select a corresponding mode based on a preset setting of the user.

Figure 17:
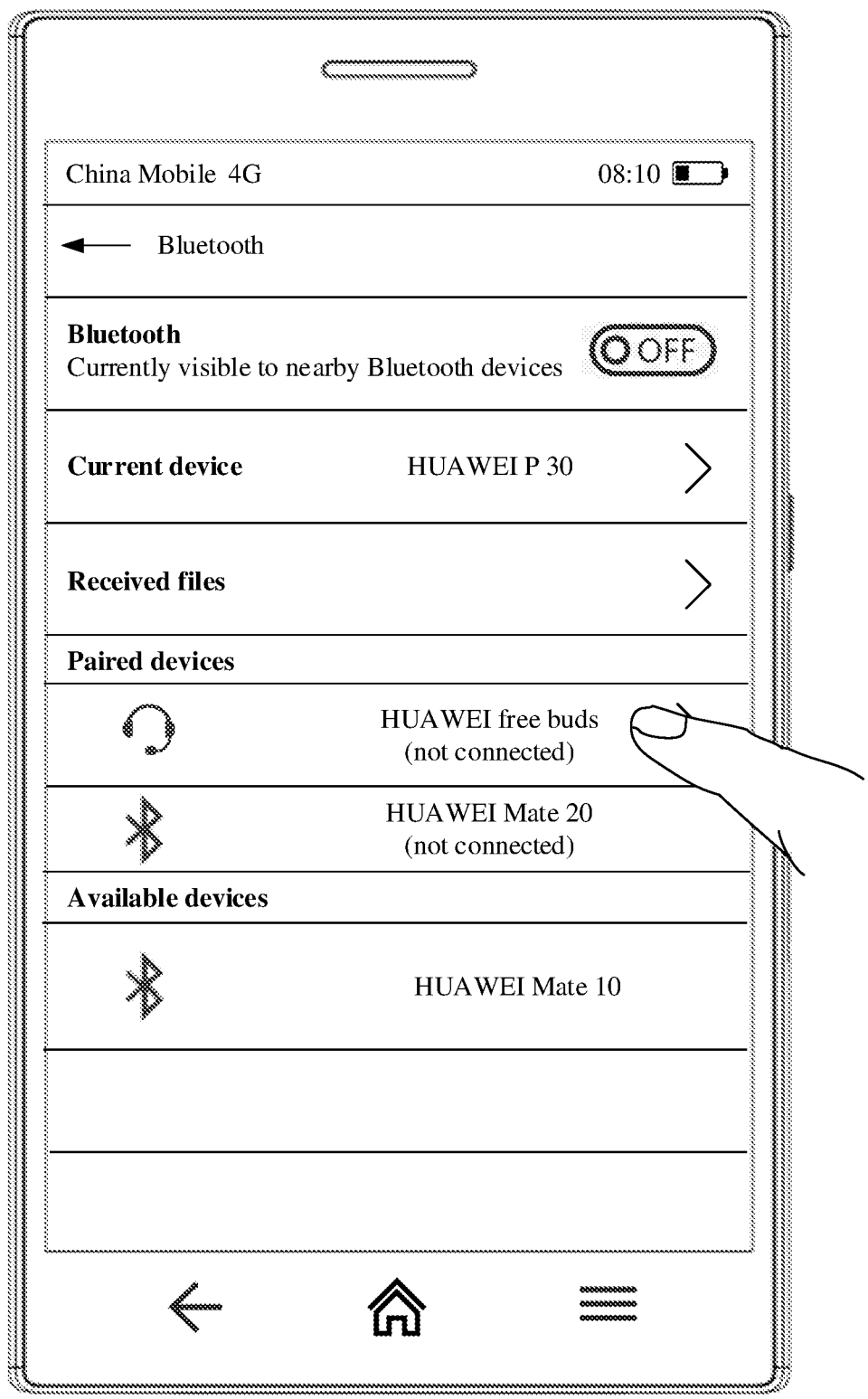
FIG. 17 is a diagram of a fifth user interface of Bluetooth power according to this application.
Figure 18:
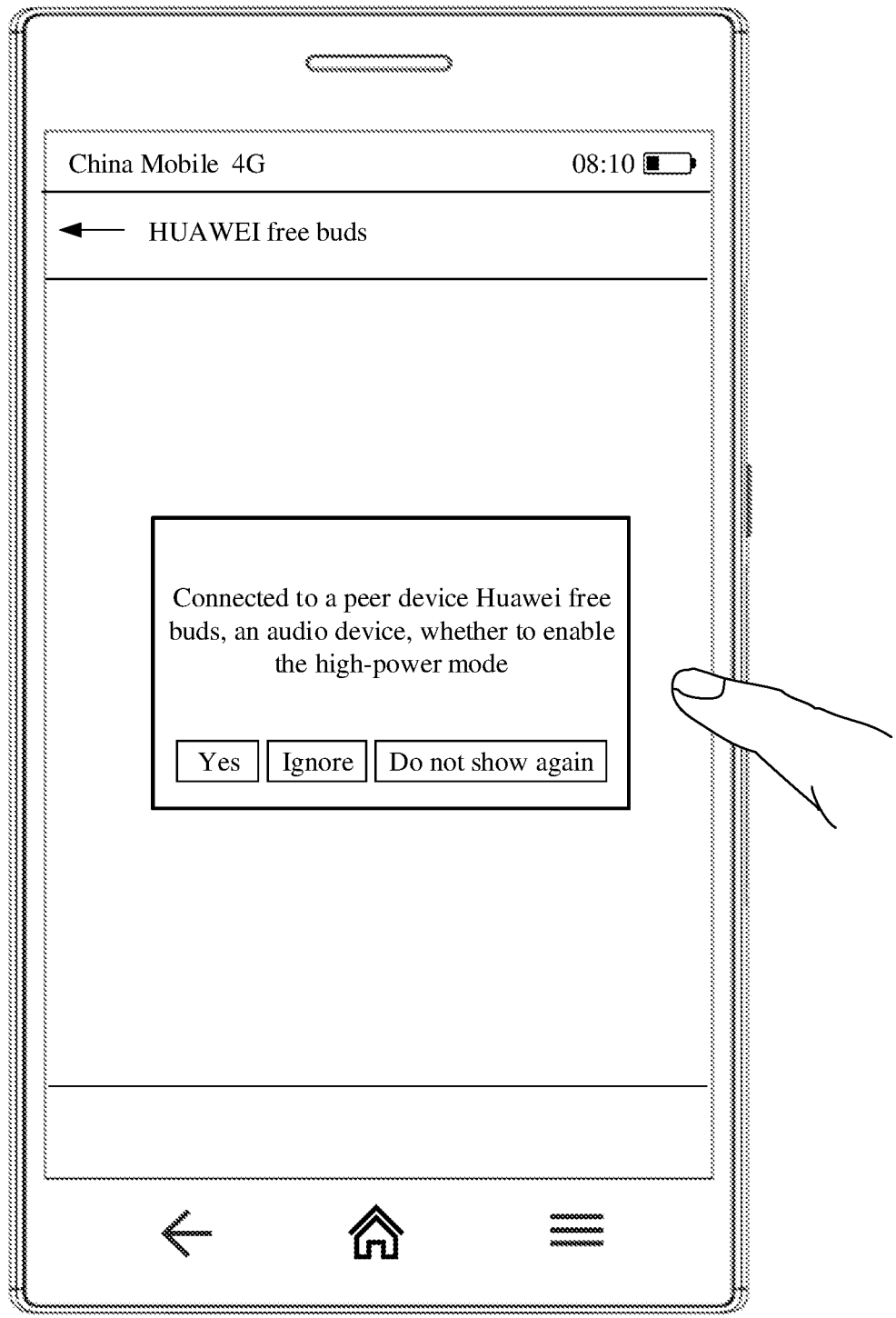
FIG. 18 is a diagram of a sixth user interface of Bluetooth power according to this application.

In some embodiments, as shown in FIG. 17, when receiving an operation performed by the user on the Bluetooth function, the terminal device may display an interface shown in FIG. 18. The interface includes the Bluetooth switch, configured to enable or disable the Bluetooth function of the terminal device; includes the information about the terminal device, for example, the device name and the identifier; includes Bluetooth devices that have been paired with the terminal device, such as the headset HUAWEI free buds and HUAWEI Mate 20 shown in the figure, and further includes a plurality of surrounding peer devices obtained through scanning, such as HUAWEI Mate 10 shown in the figure. Further, in the paired devices, a connection status between the paired device and the current terminal device may be displayed, including but not limited to a disconnected state and a connected state. FIG. 17 shows that the paired devices including HUAWEI Mate 20 and HUAWEI free buds are in the disconnected state. In the disconnected state, it may be understood that the current terminal device, HUAWEI Mate 20 and HUAWEI free buds have completed a scanning and pairing process specified in a Bluetooth protocol, but have not completed a data connection process. When a connection operation of the user is received, the interface shown in FIG. 18 may be displayed to remind the user, for example, as shown in the figure, "Connected to a peer device Huawei free buds, an audio device, whether to enable the high-power mode". If an operation command of tapping "Yes" by the user is received, the terminal device may send the data packet to the headset in the high-power mode. If an operation command of tapping "Ignore" by the user is received, the terminal device does not send the data packet to the headset in the high-power mode. If an operation command of tapping "Do not show again" by the user is received, the terminal device does not send the data packet to the headset in the high-power mode, and does not prompt the user in a pop-up box when the user performs connecting next time.

Figure 19:
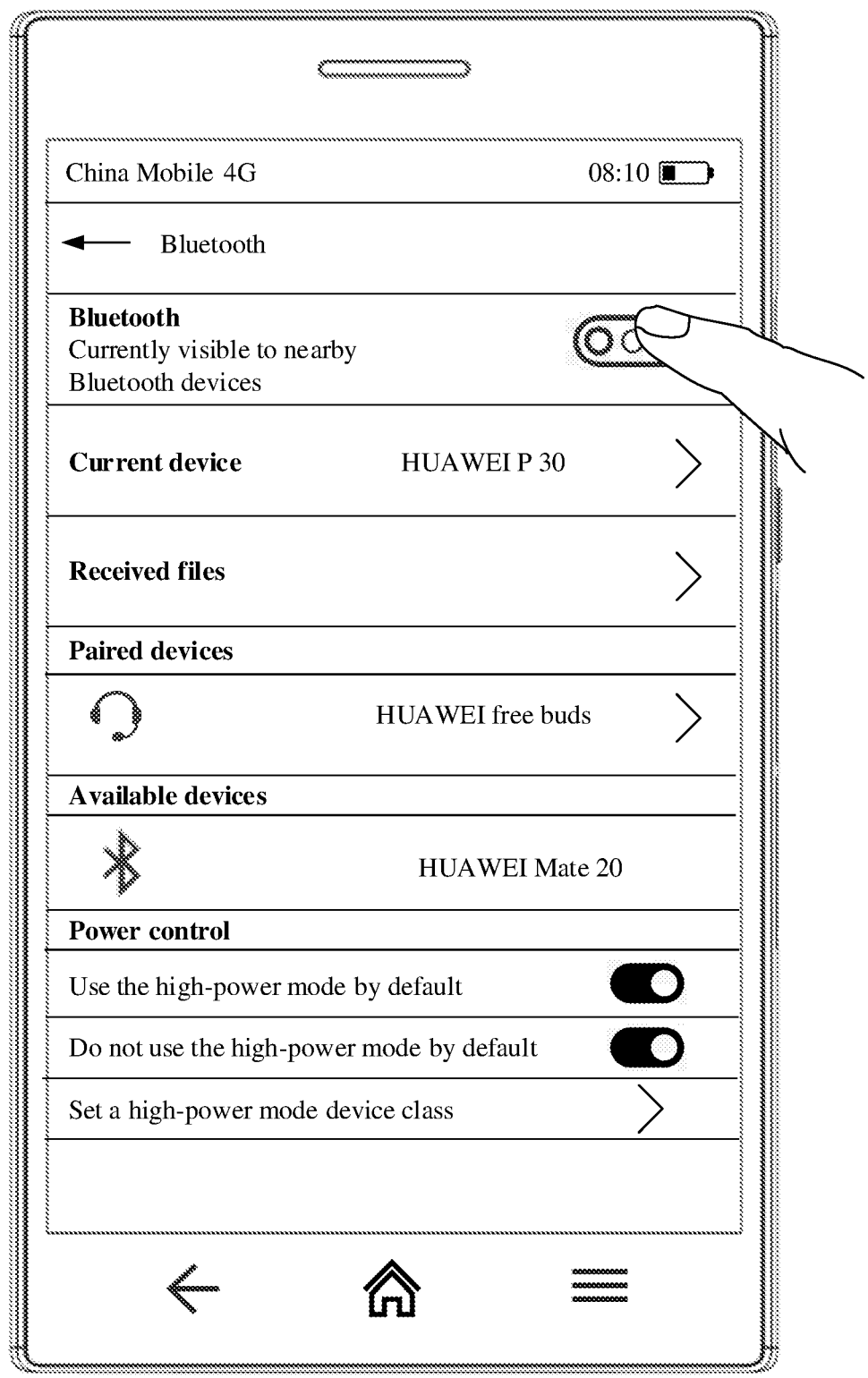
FIG. 19 is a diagram of a seventh user interface of Bluetooth power according to this application.
Figure 20:
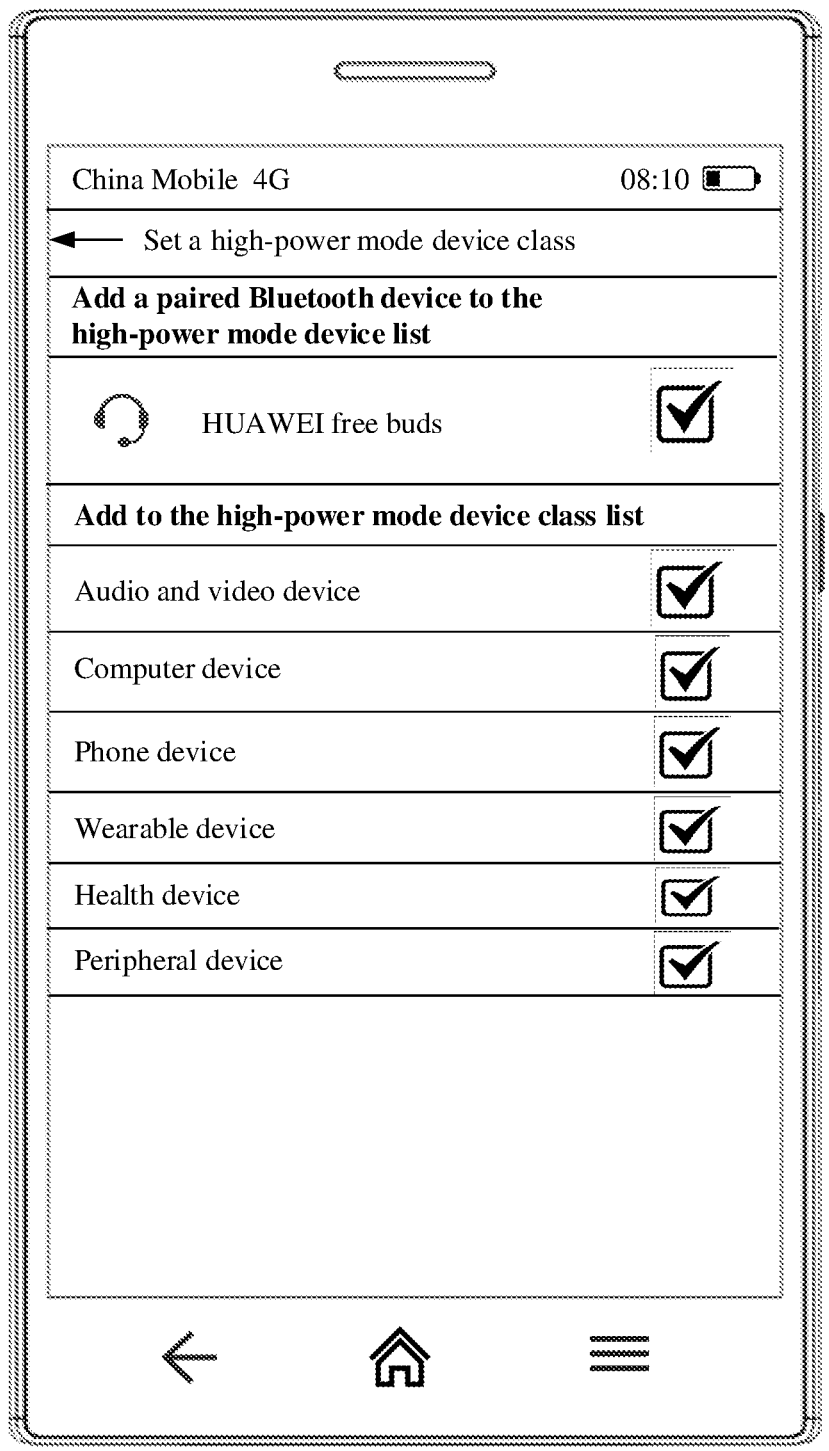
FIG. 20 is a diagram of an eighth user interface of Bluetooth power according to this application.

In some embodiments, as shown in FIG. 19, a Bluetooth settings interface may further include a power setting option. For example, the user may set a switch "Use the high-power mode by default". When receiving an enabling instruction of the user, the terminal device sends the data packet to a connected peer device in the high-power mode. A switch "Do not use the high-power mode by default" is further included. When receiving an enabling instruction of the user, the terminal device does not send the data packet to the connected peer device in the high-power mode. A switch "Set a high-power mode device class" may be further included. When an operation type for "Set a high-power mode device class" is received, a related function related to the high-power mode device class may be performed. For example, as shown in FIG. 20, "Add a paired Bluetooth device to the high-power mode device list" may be set on the interface. The interface may display a paired peer device. After receiving a selection operation of the user, for example, after selecting HUAWEI free buds, and after connecting HUAWEI free buds to the terminal device, the terminal device sends the data packet to the HUAWEI Free Buds headset in the high-power mode. The interface may further set "a high-power mode device class list". The interface may display different device classes defined by the Bluetooth protocol, for example, the major device class and the minor device class shown in Table 4 and Table 5. After receiving a selection operation of the user, for example, the user selects "Audio device", "Computer device", "Phone device", "Wearable device", "Health device", and "Peripheral device", when the terminal device is connected to the peer device, whether the peer device is one of the foregoing "Audio device", "Computer device", "Phone device", "Wearable device", "Health device", and "Peripheral device" may be determined based on a CoD class and a profile type of the peer device. For example, when determining that the peer device is the "Audio device", the terminal device may send the data packet to the peer device in the high-power mode.

Figure 21:
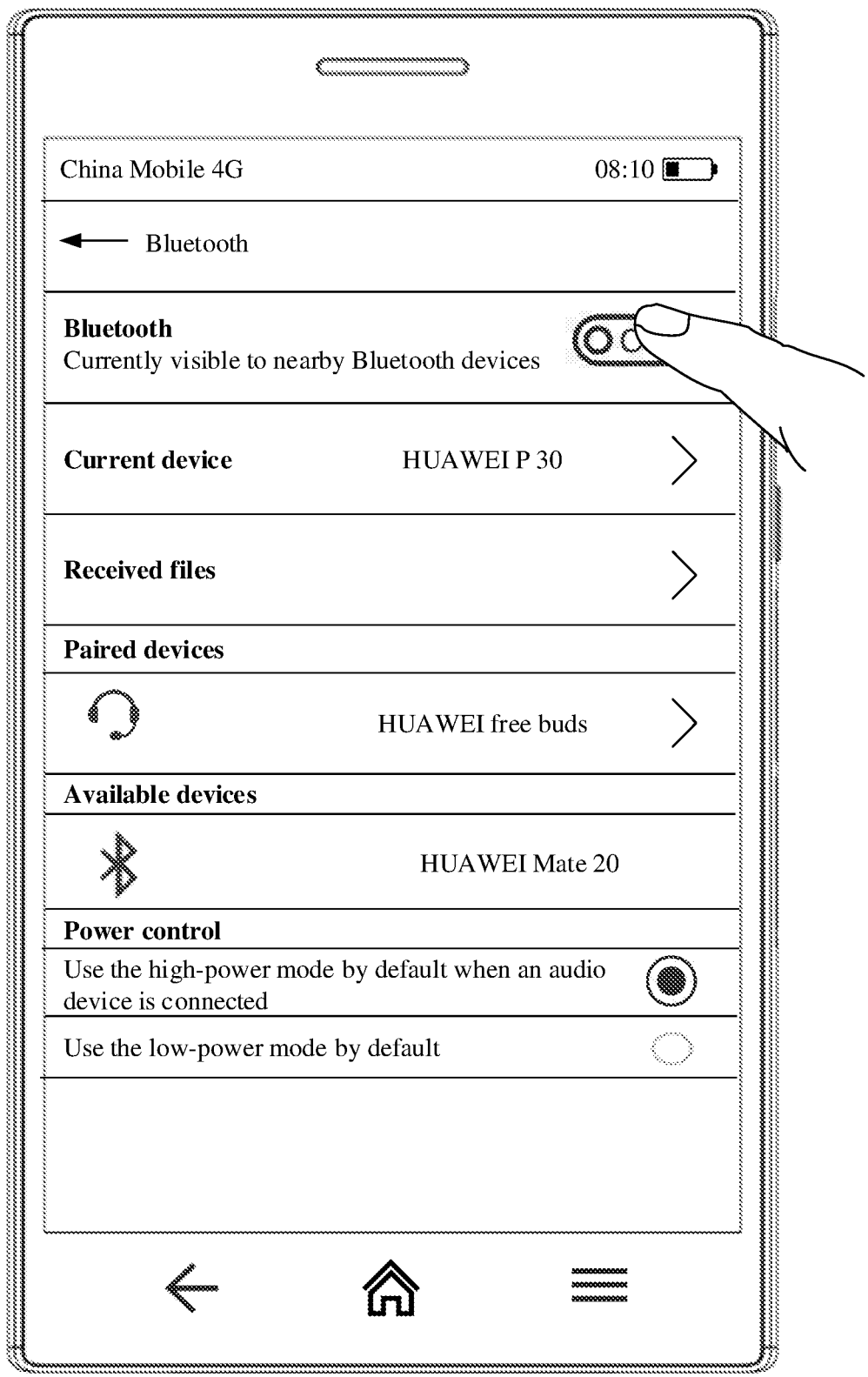
FIG. 21 is a diagram of a ninth user interface of Bluetooth power according to this application.

In some embodiments, as shown in FIG. 21, the Bluetooth settings interface may further include a power control option. For example, the power control option includes "Use the high-power mode by default when an audio device is connected". This may be used to send the data packet to the peer device in the high-power mode when the terminal device is connected to the peer device. The power control option may further include "Use the low-power mode by default". This may be used to send the data packet to the peer device in a low-power mode when the terminal device is connected to the peer device.

The method in the embodiments of this application may be implemented by the wireless communications module 160 of the terminal device 100 shown in FIG. 1, and may be specifically performed by a Bluetooth module or a Bluetooth chip. The Bluetooth chip may further receive a to-be-sent signal from the processor 110, perform frequency modulation and amplification on the signal, and convert the signal into an electromagnetic wave for radiation through the antenna 2.

The high-power mode, the low-power mode, and the like in this application may be extended to a first power mode (the terminal device sends data to the peer device by using a first transmit power or a first power) and a second power mode (the terminal device sends data to the peer device by using a second transmit power or a second power). In other words, the terminal device may use different transmit powers based on the device class of the peer device.

With descriptions of the foregoing implementations, a person skilled in the art may clearly understand that this application may be implemented by hardware, firmware or a combination thereof. When software is used for implementation, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as the computer-readable medium. For example, if software is transmitted from a website, a server or another remote source by using a coaxial cable, an optical fiber/cable, a twisted pair, a digital subscriber line (DSL), or wireless technologies such as infrared ray, radio and microwave, the coaxial cable, optical fiber/cable, twisted pair, DSL, or wireless technologies such as infrared ray, radio and microwave are included in fixation of a medium to which they belong. A disk (Disk) and disc (disc) used in this application includes a compact disc (CD), a laser disc, an optical disc, a digital versatile disc (DVD), a floppy disk, and a Blu-ray disc. The disk usually copies data magnetically, and the disc copies data optically by using a laser. The foregoing combination should also be included in the protection scope of the computer-readable medium.

In conclusion, the foregoing descriptions are merely embodiments of the technical solutions of this application, but is not intended to limit the protection scope of this application. Any modification, equivalent replacement, or improvement made according to the disclosure of this application shall fall within the protection scope of this application.

What is claimed is:

1. A terminal device, comprising:
one or more processors; and
a non-transitory memory storing one or more computer programs, the one or more computer programs for execution by the terminal device, the one or more computer programs including instructions for:
obtaining class of device information of a peer device;
determining a class of device of the peer device based on the class of device information of the peer device;
sending data to the peer device at a first transmit power in response to the class of device being a non-preset class of device; and
sending data to the peer device at a second transmit power in response to the class of device being a preset class of device;
wherein the terminal device establishes a Bluetooth connection to the peer device, and the first transmit power is less than the second transmit power; and
wherein sending the data to the peer device at the second transmit power comprises:
determining that a channel quality of the Bluetooth connection meets a first preset condition; and
sending data to the peer device at the second transmit power in response to the channel quality meeting the first preset condition.

2. The terminal device according to claim 1, wherein the instructions for sending data to the peer device at a second transmit power include instructions for:
receiving a first request of the peer device when the class of device is the preset class of device, wherein the first request indicates to increase a transmit power of the terminal device to the second transmit power; and
sending data to the peer device at the second transmit power in response to the first request.

3. The terminal device according to claim 2, wherein increasing the transmit power of the terminal device to the second transmit power comprises:
increasing the transmit power to the second transmit power by using a power amplifier of a Wi-Fi radio frequency link.

4. The terminal device according to claim 1, wherein sending data to the peer device at the second transmit power comprises:
determining that the channel quality of the Bluetooth connection meets the first preset condition;
determining that a Vo Wi-Fi (Voice over Wi-Fi) service or a key frame of a Wi-Fi service is not received or sent; and
sending data to the peer device at the second transmit power in response to determine that the channel quality meets the first preset condition and further in response to determining that the Vo Wi-Fi or the key frame of the Wi-fi service is not received or sent.

5. The terminal device according to claim 1, wherein the first preset condition is that a parameter of the Bluetooth connection is less than a first threshold, and the parameter comprises a retransmission rate or a received signal strength indicator.

6. The terminal device according to claim 5, wherein the class of device information comprises CoD (Class of Device) information or UUID (universally unique identifier) information of the peer device.

7. The terminal device according to claim 1, wherein the preset class of device is an audio device or a video device.

8. A power control method, comprising:
obtaining, by a terminal device, class of device information of a peer device;
determining, by the terminal device, based on the class of device information, a class of device of the peer device;
determining, by the terminal device, that a channel quality of a Bluetooth connection established by the terminal device to the peer device meets a second preset condition, wherein
the second preset condition is that a parameter of the Bluetooth connection is less than a first threshold, and wherein the parameter comprises a retransmission rate or a received signal strength indicator; and
performing, after determining that the channel quality of the Bluetooth connection meets the second preset condition, at least one of:
sending, by the terminal device, in response to the terminal device determining that the class of device of the peer device is a non-preset class of device, data to the peer device at a first transmit power; or
sending, by the terminal device, data to the peer device at a second transmit power in response to the terminal device determining that the class of device of the peer device is a preset class of device;
wherein the first transmit power is less than the second transmit power.

9. The method according to claim 8, further comprising performing, before the sending the data to the peer device:
receiving, by the terminal device, a first request of the peer device, wherein the first request indicates to increase a transmit power of the terminal device to the second transmit power.

10. The method according to claim 8, further comprising performing, before the sending the data to the peer device:
determining, by the terminal device, that the second transmit power is supported.

11. The method according to claim 8, further comprising performing, before the sending the data to the peer device:
determining, by the terminal device, that the terminal device meets a first preset condition, wherein the first preset condition is that the terminal device does not receive or send a Voice over Wi-Fi service or a key frame of a Wi-Fi service.

12. The method according to claim 9, wherein the class of device information comprises CoD (Class of Device) information or UUID (universally unique identifier) information of the peer device.

13. A terminal device, comprising:
one or more processors; and
a non-transitory memory storing one or more computer programs for execution by the one or more processors, wherein the one or more computer programs include instructions for:

obtaining class of device information of a peer device; and determining a class of device of the peer device based on the class of device information of the peer device; and performing, in response to the class of device being an audio or video class of device;

increasing a transmit power; and sending data to the audio or video device at the increased transmit power;

wherein the instructions for increasing the transmit power, and sending data to the audio or video device at the increased transmit power include instructions for:

determining that a channel quality of a Bluetooth connection meets a first preset condition, wherein the first preset condition is that a parameter of the Bluetooth connection is less than a first threshold, and the parameter comprises a retransmission rate or a received signal strength indicator.

14. The terminal device according to claim 13, wherein the instructions for increasing the transmit power, and sending the data to the audio or video device at the increased transmit power include instructions for:

receiving a first request of the audio or video device, wherein the first request indicates to increase the transmit power of the terminal device; and increasing the transmit power in response to the first request; and sending the data to the audio or video device at the increased transmit power.

15. The terminal device according to claim 14, wherein the class of device is the audio or video class of device, and wherein the instructions for increasing the transmit power, and sending data to the audio or video device at the increased transmit power include instructions for:

determining that the class of device is the audio or video class of device;

determining that the channel quality of the Bluetooth connection meets the first preset condition;

determining that a Voice over Wi-Fi service or a key frame of a Wi-Fi service is not received or sent; and increasing the transmit power, and sending the data to the audio or video device at the increased transmit power.

16. The terminal device according to claim 14, wherein the class of device information comprises CoD (Class of Device) information or UUID (universally unique identifier) information of the audio or video device.

* * * * *